(12) United States Patent
Binette et al.

(10) Patent No.: US 9,937,385 B2
(45) Date of Patent: Apr. 10, 2018

(54) GOLF BALLS HAVING A FOAM CENTER WITH REGIONS OF DIFFERENT HARDNESS

(71) Applicant: Acushnet Company, Fairhaven, MA (US)

(72) Inventors: Mark L. Binette, Mattapoisett, MA (US); Michael J. Sullivan, Old Lyme, CT (US); Douglas S. Goguen, New Bedford, MA (US); Brian Comeau, Berkley, MA (US); Michael Michalewich, Norton, MA (US); Shawn Ricci, New Bedford, MA (US); John D. Farrell, Providence, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 15/071,381

(22) Filed: Mar. 16, 2016

(65) Prior Publication Data

US 2017/0266510 A1    Sep. 21, 2017

(51) Int. Cl.
| | |
|---|---|
| A63B 37/06 | (2006.01) |
| A63B 37/00 | (2006.01) |
| A63B 45/00 | (2006.01) |

(52) U.S. Cl.
CPC ...... *A63B 37/0094* (2013.01); *A63B 37/0031* (2013.01); *A63B 37/0039* (2013.01); *A63B 37/0044* (2013.01); *A63B 37/0045* (2013.01); *A63B 37/0047* (2013.01); *A63B 37/0051* (2013.01); *A63B 37/0058* (2013.01); *A63B 37/0061* (2013.01); *A63B 37/0063* (2013.01); *A63B 37/0064* (2013.01); *A63B 37/0065* (2013.01); *A63B 37/0066* (2013.01); *A63B 37/0075* (2013.01); *A63B 37/0076* (2013.01); *A63B 37/0084* (2013.01); *A63B 37/0092* (2013.01); *A63B 37/0096* (2013.01); *A63B 45/00* (2013.01)

(58) Field of Classification Search
USPC ................................................. 473/351-378
See application file for complete search history.

(56) References Cited

U.S. PATENT DOCUMENTS

| | | | |
|---|---|---|---|
| 4,836,552 | A | 6/1989 | Pucket et al. |
| 4,839,116 | A | 6/1989 | Puckett et al. |

(Continued)

FOREIGN PATENT DOCUMENTS

EP    0154735    9/1985

*Primary Examiner* — Alvin Hunter
(74) *Attorney, Agent, or Firm* — Daniel W. Sullivan

(57) ABSTRACT

Golf balls having a multi-layered core made of a foamed composition are provided. The core preferably has a foam inner core (center) and surrounding thermoset or thermoplastic outer core layer. Preferably, a polyurethane foam composition is used to form the foam center. The foam inner core preferably includes a fully-foamed center region and a partially or completely-collapsed foam outer region. The hardness of the fully-foamed region is different than the hardness of the collapsed foam region. Non-foamed thermoset or thermoplastic materials such as polybutadiene rubbers or ethylene acid copolymer ionomer may be used to form the outer core layer. The ball further includes a cover that may be multi-layered. The foam cores have good resiliency.

18 Claims, 7 Drawing Sheets

(56) References Cited

U.S. PATENT DOCUMENTS

| | | |
|---|---|---|
| 5,104,126 A | 4/1992 | Gentiluomo |
| 5,253,871 A | 10/1993 | Viollaz |
| 5,439,227 A | 8/1995 | Egashira et al. |
| 5,482,285 A | 1/1996 | Yabuki et al. |
| 5,556,098 A | 9/1996 | Higuchi et al. |
| 5,688,192 A | 11/1997 | Aoyama |
| 5,688,595 A | 11/1997 | Yamagishi et al. |
| 5,725,442 A | 3/1998 | Higuchi et al. |
| 5,823,889 A | 10/1998 | Aoyama |
| 5,833,553 A | 11/1998 | Sullivan et al. |
| 6,057,403 A | 5/2000 | Sullivan et al. |
| 6,213,895 B1 | 4/2001 | Sullivan et al. |
| 6,245,859 B1 | 6/2001 | Sullivan et al. |
| 6,386,992 B1 | 5/2002 | Harris et al. |
| 6,390,935 B1 | 5/2002 | Sugimoto |
| 6,431,999 B1 | 8/2002 | Nesbitt |
| 6,494,795 B2 | 12/2002 | Sullivan |
| 6,520,872 B2 | 2/2003 | Endo et al. |
| 6,634,962 B2 | 10/2003 | Sullivan |
| 6,688,991 B2 | 2/2004 | Sullivan et al. |
| 6,692,380 B2 | 2/2004 | Sullivan et al. |
| 6,743,123 B2 | 6/2004 | Sullivan |
| 6,767,294 B2 * | 7/2004 | Nesbitt .............. A63B 37/0003 473/351 |
| 6,852,042 B2 | 2/2005 | Sullivan et al. |
| 6,939,249 B2 | 9/2005 | Sullivan |
| 6,995,191 B2 | 2/2006 | Sullivan et al. |
| 7,147,578 B2 | 12/2006 | Nesbitt et al. |
| 7,160,208 B2 | 1/2007 | Watanabe |
| 7,255,656 B2 | 8/2007 | Sullivan et al. |
| 7,371,192 B2 | 5/2008 | Sullivan et al. |
| 7,452,291 B2 | 11/2008 | Sullivan et al. |
| 7,708,654 B2 | 5/2010 | Sullivan et al. |
| 7,785,216 B2 | 8/2010 | Hebert et al. |
| 7,935,004 B2 | 5/2011 | Dalton et al. |
| 8,272,971 B2 | 9/2012 | Tutmark |
| 9,180,346 B2 * | 11/2015 | Binette .............. A63B 37/0051 |
| 9,248,350 B2 * | 2/2016 | Sullivan .............. A63B 37/0064 |
| 9,375,612 B2 * | 6/2016 | Comeau .............. A63B 37/0066 |
| 9,656,127 B2 * | 5/2017 | Binette .............. A63B 37/0075 |
| 2014/0113745 A1 * | 4/2014 | Sullivan .............. A63B 37/006 473/372 |
| 2014/0256469 A1 * | 9/2014 | Sullivan .............. A63B 37/0032 473/373 |
| 2014/0323241 A1 * | 10/2014 | Sullivan .............. A63B 37/0058 473/374 |
| 2014/0323244 A1 * | 10/2014 | Sullivan .............. A63B 37/0038 473/376 |
| 2015/0087444 A1 * | 3/2015 | Sullivan .............. A63B 37/0051 473/374 |
| 2015/0126307 A1 * | 5/2015 | Comeau .............. A63B 37/0066 473/376 |
| 2015/0157897 A1 * | 6/2015 | Sullivan .............. A63B 37/0064 473/376 |
| 2016/0096077 A1 * | 4/2016 | Sullivan .............. A63B 37/0066 473/376 |
| 2016/0129315 A1 * | 5/2016 | Sullivan .............. A63B 37/0063 473/371 |
| 2016/0144242 A1 * | 5/2016 | Sullivan .............. A63B 37/0064 473/376 |
| 2016/0151678 A1 * | 6/2016 | Sullivan .............. A63B 37/0058 473/376 |
| 2016/0303430 A1 * | 10/2016 | Sullivan .............. A63B 37/0058 |
| 2017/0021232 A1 * | 1/2017 | Sullivan .............. A63B 37/0038 |
| 2017/0036070 A1 * | 2/2017 | Sullivan .............. A63B 37/0058 |
| 2017/0050085 A1 * | 2/2017 | Sullivan .............. A63B 37/0033 |
| 2017/0050087 A1 * | 2/2017 | Sullivan .............. A63B 37/0058 |
| 2017/0080296 A1 * | 3/2017 | Sullivan .............. A63B 37/0032 |

\* cited by examiner

GOLF BALLS HAVING A FOAM CENTER WITH REGIONS OF DIFFERENT HARDNESS

BACKGROUND OF THE INVENTION

Field of the Invention

The present invention relates generally to multi-layered, golf balls having a foam core with regions of different hardness. A dual-layered core having an inner core (center) and surrounding thermoset or thermoplastic outer core layer is preferably prepared. The foam center preferably includes a fully-foamed region and a partially or completely-collapsed foam region. The hardness of the fully-foamed region is different than the hardness of the collapsed foam region. The ball further includes a cover having at least one layer.

Brief Review of the Related Art

Both professional and amateur golfer use multi-piece, solid golf balls today. Basically, a two-piece solid golf ball includes a solid inner core protected by an outer cover. The inner core is made of a natural or synthetic rubber such as polybutadiene, styrene butadiene, or polyisoprene. The cover surrounds the inner core and may be made of a variety of materials including, for example, ethylene acid copolymer ionomers, polyamides, polyesters, polyurethanes, and polyureas.

In recent years, three-piece, four-piece, and even five-piece balls have become more popular. New manufacturing technologies, lower material costs, and desirable performance properties have contributed to these multi-piece balls becoming more popular. Many golf balls used today have multi-layered cores comprising an inner core and at least one surrounding outer core layer. For example, the inner core may be made of a relatively soft and resilient material, while the outer core may be made of a harder and more rigid material. The "dual-core" sub-assembly is encapsulated by a cover having at least one layer to provide a final ball assembly. Different materials can be used to manufacture the core and cover thus imparting desirable properties to the final ball.

In general, dual-cores comprising an inner core (or center) and a surrounding outer core layer are known in the industry. For example, Sugimoto, U.S. Pat. No. 6,390,935 discloses a three-piece golf ball comprising a core having a center and outer shell and a cover disposed about the core. The specific gravity of the outer shell is greater than the specific gravity of the center. The center has a JIS-C hardness (X) at the center point thereof and a JIS-C hardness (Y) at a surface thereof satisfying the equation: (Y−X)≥8. The core structure (center and outer shell) has a JIS-C hardness (Z) at a surface of 80 or greater. The cover has a Shore D hardness of less than 60.

Endo, U.S. Pat. No. 6,520,872 discloses a three-piece golf ball comprising a center, an intermediate layer formed over the center, and a cover formed over the intermediate layer. The center is preferably made of high-cis polybutadiene rubber; and the intermediate and cover layers are preferably made of an ionomer resin such as an ethylene acid copolymer.

Watanabe, U.S. Pat. No. 7,160,208 discloses a three-piece golf ball comprising a rubber-based inner core; a rubber-based outer core layer; and a polyurethane elastomer-based cover. The inner core layer has a JIS-C hardness of 50 to 85; the outer core layer has a JIS-C hardness of 70 to 90; and the cover has a Shore D hardness of 46 to 55. Also, the inner core has a specific gravity of more than 1.0, and the core outer layer has a specific gravity equal to or greater than that of that of the inner core.

The core sub-structure located inside of the golf ball acts as an engine or spring for the ball. Thus, the composition and construction of the core is a key factor in determining the resiliency and rebounding performance of the ball. In general, the rebounding performance of the ball is determined by calculating its initial velocity after being struck by the face of the golf club and its outgoing velocity after making impact with a hard surface. More particularly, the "Coefficient of Restitution" or "COR" of a golf ball refers to the ratio of a ball's rebound velocity to its initial incoming velocity when the ball is fired out of an air cannon into a rigid vertical plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize COR under such conditions. Balls with a higher rebound velocity have a higher COR value. Such golf balls rebound faster, retain more total energy when struck with a club, and have longer flight distance versus balls with low COR values. These properties are particularly important for long distance shots. For example, balls having high resiliency and COR values tend to travel a relatively far distance when struck by a driver club from a tee.

The durability, spin rate, and feel of the ball also are important properties. In general, the durability of the ball refers to the impact-resistance of the ball. Balls having low durability appear worn and damaged even when such balls are used only for brief time periods. In some instances, the cover may be cracked or torn. The spin rate refers to the ball's rate of rotation after it is hit by a club. Balls having a relatively high spin rate are advantageous for short distance shots made with irons and wedges. Professional and highly skilled amateur golfers can place a back spin more easily on such balls. This helps a player better control the ball and improves shot accuracy and placement. By placing the right amount of spin on the ball, the player can get the ball to stop precisely on the green or place a fade on the ball during approach shots. On the other hand, recreational players who cannot intentionally control the spin of the ball when hitting it with a club are less likely to use high spin balls. For such players, the ball can spin sideways more easily and drift far-off the course, especially if the ball is hooked or sliced. Meanwhile, the "feel" of the ball generally refers to the sensation that a player experiences when striking the ball with the club and it is a difficult property to quantify. Most players prefer balls having a soft feel, because the player experience a more natural and comfortable sensation when their club face makes contact with these balls. Balls having a softer feel are particularly desirable when making short shots around the green, because the player senses more with such balls. The feel of the ball primarily depends upon the hardness and compression of the ball.

Manufacturers of golf balls are constantly looking to different materials for improving the playing performance and other properties of the ball. For example, golf balls containing cores made from foam compositions are generally known in the industry. Puckett and Cadorniga, U.S. Pat. Nos. 4,836,552 and 4,839,116 disclose one-piece, short distance golf balls made of a foam composition comprising a thermoplastic polymer (ethylene acid copolymer ionomer such as Surlyn®) and filler material (microscopic glass bubbles). The density of the composition increases from the center to the surface of the ball. Thus, the ball has relatively dense outer skin and a cellular inner core. According to the '552 and '116 Patents, by providing a short distance golf ball, which will play approximately 50% of the distance of a conventional golf ball, the land requirements for a golf course can be reduced 67% to 50%.

Gentiluomo, U.S. Pat. No. 5,104,126 discloses a three-piece golf ball (FIG. 2) containing a high density center (3) made of steel, surrounded by an outer core (4) of low density resilient syntactic foam composition, and encapsulated by an ethylene acid copolymer ionomer (Surlyn®) cover (5). The '126 Patent defines the syntactic foam as being a low density composition consisting of granulated cork or hollow spheres of either phenolic, epoxy, ceramic or glass, dispersed within a resilient elastomer.

Aoyama, U.S. Pat. Nos. 5,688,192 and 5,823,889 disclose a golf ball containing a core, wherein the core comprising an inner and outer portion, and a cover made of a material such as balata rubber or ethylene acid copolymer ionomer. The core is made by foaming, injecting a compressible material, gasses, blowing agents, or gas-containing microspheres into polybutadiene or other core material. According to the '889 Patent, polyurethane compositions may be used. The compressible material, for example, gas-containing compressible cells may be dispersed in a limited part of the core so that the portion containing the compressible material has a specific gravity of greater than 1.00. Alternatively, the compressible material may be dispersed throughout the entire core. In one embodiment, the core comprises an inner and outer portion. In another embodiment, the core comprises inner and outer layers.

Sullivan and Ladd, U.S. Pat. No. 6,688,991 discloses a golf ball containing a low specific gravity core, optional intermediate layer, and high specific gravity cover with Shore D hardness in the range of about 40 to about 80. The core is preferably made from a highly neutralized thermoplastic polymer such as ethylene acid copolymer which has been foamed.

Nesbitt, U.S. Pat. No. 6,767,294 discloses a golf ball comprising: i) a pressurized foamed inner center formed from a thermoset material, a thermoplastic material, or combinations thereof, a blowing agent and a cross-linking agent and, ii) an outer core layer formed from a second thermoset material, a thermoplastic material, or combinations thereof. Additionally, a barrier resin or film can be applied over the outer core layer to reduce the diffusion of the internal gas and pressure from the nucleus (center and outer core layer). Preferred polymers for the barrier layer have low permeability such as Saran® film (poly (vinylidene chloride), Barex® resin (acyrlonitrile-co-methyl acrylate), poly (vinyl alcohol), and PET film (polyethylene terephthalate). The '294 Patent does not disclose core layers having different hardness gradients.

Sullivan, Ladd, and Hebert, U.S. Pat. No. 7,708,654 discloses a golf ball having a foamed intermediate layer. Referring to FIG. 1 in the '654 Patent, the golf ball includes a core (12), an intermediate layer (14) made of a highly neutralized polymer having a reduced specific gravity (less than 0.95), and a cover (16). According to the '654 Patent, the intermediate layer can be an outer core, a mantle layer, or an inner cover. The reduction in specific gravity of the intermediate layer is caused by foaming the composition of the layer and this reduction can be as high as 30%. The '654 Patent discloses that other foamed compositions such as foamed polyurethanes and polyureas may be used to form the intermediate layer.

Tutmark, U.S. Pat. No. 8,272,971 is directed to golf balls containing an element that reduces the distance of the ball's flight path. In one embodiment, the ball includes a core and cover. A cavity is formed between core and cover and this may be filled by a foamed polyurethane "middle layer" in order to dampen the ball's flight properties. The foam of the middle layer is relatively light in weight; and the core is relatively heavy and dense. According to the '971 Patent, when a golfer strikes the ball with a club, the foam in the middle layer actuates and compresses, thereby absorbing much of the impact from the impact of the ball.

Although some foam core constructions for golf balls have been considered over the years, there are drawbacks with using such foam materials. For example, one disadvantage with golf balls having a foam core is the ball tends to have low resiliency (rebounding performance). That is, the velocity of the ball tends to be low after being hit by a club and the ball generally travels short distances. There is a need for new balls having a foam core with improved resiliency that will allow players to generate higher initial ball speed. This will allow players to make longer distance shots. The present invention provides new foam core constructions having improved resiliency and durability and other advantageous properties; and new methods for making such cores. The invention also encompasses new golf balls containing the improved core construction.

SUMMARY OF THE INVENTION

The present invention provides a golf ball comprising a core assembly and cover. The golf ball comprises an inner core layer comprising a foam composition. The inner core generally has a diameter in the range of about 0.100 to about 1.100 inches, and preferably about 0.100 to about 0.900 inches. The foamed inner core has a geometric center, outer surface region, and outer surface skin, wherein the foam composition is foamed in the center and at least partially-collapsed in the outer region. The foam may be completely collapsed in the outer region. The inner core also has an outer surface hardness ($H_{inner\ core\ surface}$) and a center hardness ($H_{inner\ core\ center}$), wherein the $H_{inner\ core\ surface}$ is greater than the $H_{inner\ core\ center}$ to provide a positive hardness gradient in the inner core. The outer core layer comprises a non-foamed thermoset or thermoplastic composition. The outer core layer is disposed about the inner core and has a thickness in the range of about 0.100 to about 0.750 inches, preferably about 0.250 to about 0.650 inches. The outer surface hardness of the outer core layer is preferably greater than the center hardness of the inner core so as to provide a positive hardness gradient across the core assembly.

In one embodiment, the method for making the core assembly (foamed inner core and surrounding non-foamed outer core layer) comprises the following steps. First, a foam composition is molded into an inner core structure. Then, the foamed inner core structure is thermally or chemically-treated so as to at least partially-collapse the foam in the outer region. In some instances, the foam in the outer region is completely collapsed by this treatment.

The foamed inner core preferably has regions of different hardness. For example, in one version, the ($H_{inner\ core\ center}$) is preferably in the range of about 10 to about 55 Shore C and the ($H_{inner\ core\ surface}$) is preferably in the range of about 15 to about 60 Shore C to provide a positive hardness gradient across the inner core. The foamed inner core also may have a midpoint hardness in the outer region ($H_{midpoint\ inner\ core\ outer\ region}$), wherein the $H_{inner\ core\ surface}$ is greater than the $H_{midpoint\ inner\ core\ outer\ region}$ and the $H_{midpoint\ inner\ core\ outer\ region}$ is greater than the $H_{inner\ core\ center}$. Thus, in one instance, the $H_{inner\ core\ surface} > H_{midpoint\ inner\ core\ outer\ region} > H_{inner\ core\ center}$. Also, the outer core layer may have an outer surface hardness ($H_{outer\ surface\ of\ OC}$) and a midpoint hardness ($H_{midpoint\ of\ OC}$), wherein the $H_{outer\ surface\ of\ OC}$ is greater than the $H_{midpoint\ of\ OC}$ to provide a positive hardness gradient across the outer core. For example, the $H_{outer\ surface\ of\ OC}$ may be in the range of about 50 to about 98 Shore C and the $H_{midpoint\ of\ OC}$ may be in the range of about 45 to about 90 Shore C to provide a positive hardness gradient. In yet another version, the $H_{outer\ surface\ of\ OC}$ is less than the $H_{midpoint\ of\ OC}$ to provide a negative hardness gradient. For example, the $H_{outer\ surface\ of\ OC}$ may be in the range of about 42 to about 92 Shore C and the $H_{midpoint\ of\ OC}$ may be in the range of about 47 to about 97 Shore C.

The foamed inner core also preferably has regions of different density. For example, the foamed inner core may have an outer surface specific gravity ($SG_{inner\ core\ surface}$) and a center specific gravity ($SG_{inner\ core\ center}$), wherein the $SG_{inner\ core\ surface}$ is greater than the $SG_{inner\ core\ center}$. The foamed inner core also may have a midpoint specific gravity in the outer region ($SG_{midpoint\ inner\ core\ outer\ region}$), wherein the $SG_{inner\ core\ surface}$ is greater than the $SG_{midpoint\ inner\ core\ outer\ region}$ and the $SG_{midpoint\ inner\ core\ outer\ region}$ is greater than the $SG_{inner\ core\ center}$. Thus, in one instance, the $SG_{inner\ core\ surface} > SG_{midpoint\ inner\ core\ outer\ region} > SG_{inner\ core\ center}$.

Thermoset or thermoplastic materials are used to form the foamed inner core, and preferably a foamed polyurethane inner core is prepared. Non-foamed thermoset or thermoplastic materials also may be used to form the outer core layer. Preferably, a thermoset rubber material such as polybutadiene rubber is used. Thus, in one embodiment, the dual-core includes a foam inner core (center) and a surrounding non-foamed thermoset core layer that is preferably made from polybutadiene rubber. In another embodiment, the dual-core includes a foam inner core (center) and a surrounding non-foamed thermoplastic core layer made from partially or highly neutralized olefin acid copolymers. Non-ionomeric thermoplastic polymers also may be used.

The core layers preferably have different hardness gradients. For example, each core layer may have a positive, zero, or negative hardness gradient as described above. In a first embodiment, the inner core has a positive hardness gradient; and the outer core layer has a positive hardness gradient. In yet another embodiment, the inner core has a positive hardness gradient, and the outer core layer has zero or negative hardness gradient.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Golf Ball Constructions

Golf balls having various constructions may be made in accordance with this invention. For example, golf balls having two-piece, three-piece, four-piece, and five-piece constructions with single or multi-layered cover materials may be made. Representative illustrations of such golf ball constructions are provided and discussed further below. The term, "layer" as used herein means generally any spherical portion of the golf ball. More particularly, in one version, a three-piece golf ball containing a dual-layered core and single-layered cover is made. The dual-core includes an inner core (center) and surrounding outer core layer. In another version, a four-piece golf ball containing a dual-core and dual-cover (inner cover and outer cover layers) is made. In yet another construction, a four-piece or five-piece golf ball containing a dual-core; casing layer(s); and cover layer(s) may be made. Two-piece golf balls containing a center and surrounding cover also may be made. As used herein, the term, "casing layer" means a layer of the ball disposed between the multi-layered core sub-assembly and cover. The casing layer also may be referred to as a mantle or intermediate layer. The diameter and thickness of the different layers along with properties such as hardness and compression may vary depending upon the construction and desired playing performance properties of the golf ball.

Inner Core Composition

Figure 1:
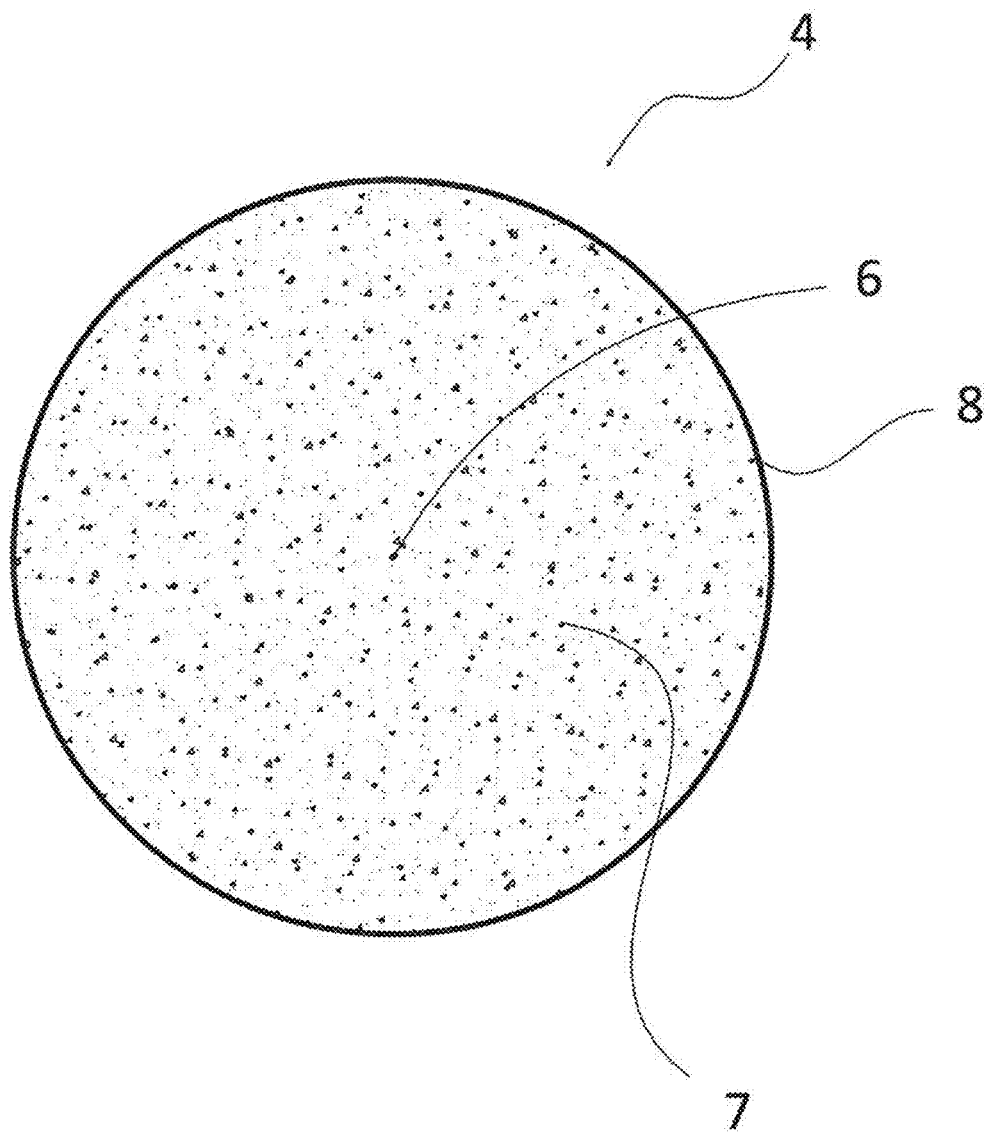
FIG. 1 is a is a cross-sectional view of a spherical inner core showing a foamed geometric center, outer region, and outer surface skin, the inner core being made in accordance with the present invention.

Preferably, the golf balls of this invention contain a core structure comprising an inner core (center) and encapsulating outer core layer. In the present invention, a foam composition is used to make the inner core. The method for making the foamed inner core comprises the following distinct steps. First, a foam composition is molded into an inner core structure. This molding process is described in further detail below. Referring to FIG. 1, an inner core (4) is made from a foamed composition that includes a geometric center (6) and surrounding outer surface region (7) and outer surface (8). When the inner core structure (4) is first made, the geometric center (6) and surrounding outer region (7) are foamed. The outer surface (8) of the inner core is generally a non-foamed, and relatively thin and dense layer. This surface may be referred to as the "skin" of the foamed composition. In one embodiment, the thickness of the outer skin (8) is in the range of about 0.001 inches (1 mil) to about 0.500 inches (500 mils) and preferably in the range of about 0.100 to about 0.300 inches. More preferably, the thickness of the outer skin (8) is preferably less than about 0.250 inches and even more preferably less than 0.150 inches.

Figure 1A:
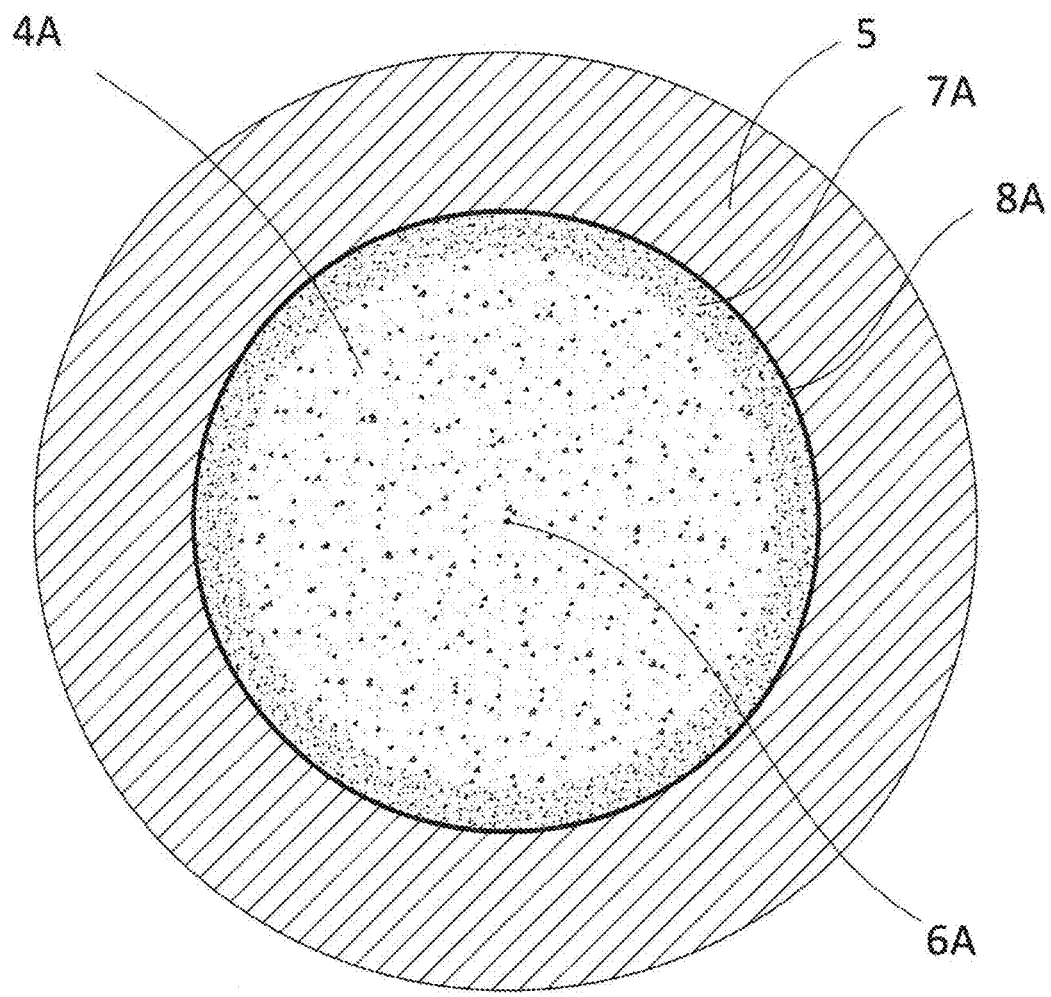
FIG. 1A is a is a cross-sectional view of a core assembly showing an inner core having a foamed geometric center, partially-collapsed foamed outer region, and outer surface skin; and a surrounding outer core layer, the core assembly being made in accordance with the present invention.
Figure 1B:
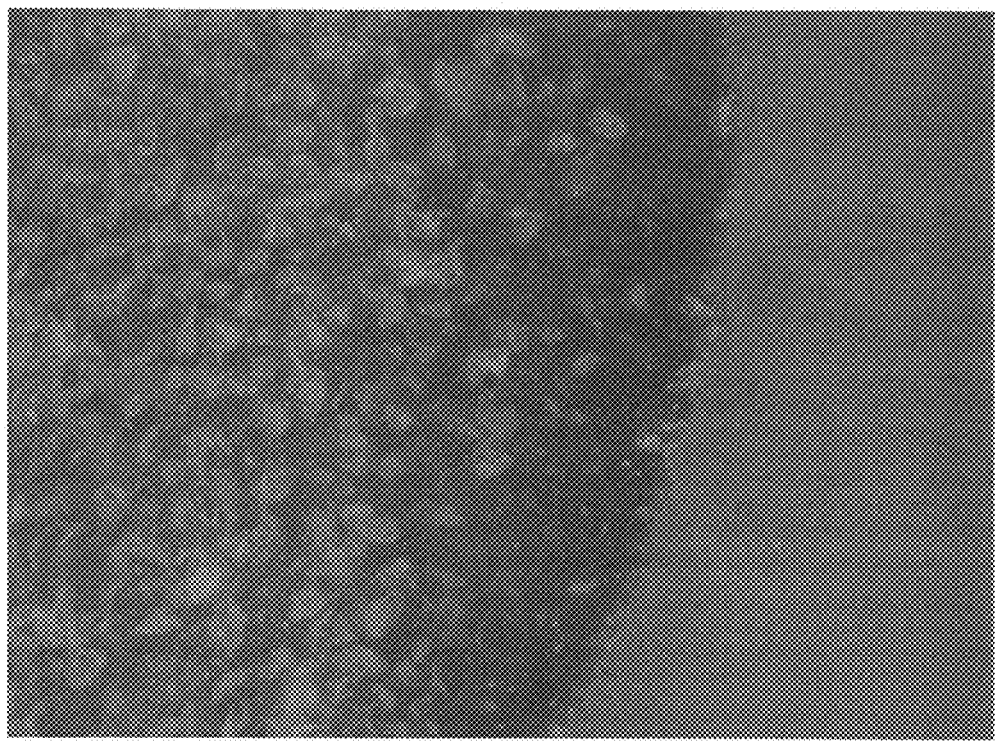
FIG. 1B is a photomicrograph showing a cross-sectional view of a core assembly with an inner core having a foamed geometric center, partially-collapsed foamed outer region, and outer surface skin; and a surrounding outer core layer, the core assembly being made in accordance with the present invention.

In a subsequent step, as described in further detail below, the foamed inner core (4) is thermally or chemically-treated. For example, in one preferred embodiment, an outer core layer is over-molded the inner core structure. In this process, the heat used in the molding cycle activates/decomposes the foamed outer region (7) of the inner core (4). This over-molding step causes the foamed outer region (7) of the inner core (4) to at least partially collapse. Referring to FIG. 1A, the inner core (4a) is shown with a foamed geometric center (6a) and partially-collapsed outer region (7a) and outer surface (skin) (8a). An outer core (5), which is formed by this over-molding process, surrounds the inner core (4a). In some instances, the foam in the outer region (7a) is completely collapsed by this treatment. Meanwhile, the foamed state of the geometric enter (6a) is maintained. In FIG. 1B, a photomicrograph shows the inner core with a foamed geometric center, partially-collapsed outer region, and an outer skin, wherein the different morphologies of the regions are visible. For example, there are less foam cells visible in the partially-collapsed outer region. An outer core (5), which is formed by this over-molding process, surrounds the inner core (4a). The outer core layer (5) may be molded over the foamed inner core (4a) using a variety of molding methods that involve subjecting the inner core (4a) to heat and pressure as described in further detail below. This treatment creates a non-foamed outer region (7a) having different properties than the foamed center of the inner core (4a). For example, in one preferred embodiment, the hardness of the outer region (7a) is greater than the hardness of the center (6a) to create a positive hardness gradient across the inner core structure (4). These hardness gradients are discussed in further detail below. The specific gravity or density) of the outer region (7a) also may be greater than the specific gravity of the center (6a). Other thermal and chemical treatments for partially or completely collapsing the foam in the outer region (7) are described further below. For example, in another version, an over-molding process is not used. Rather, the foamed inner core structure (4) may be placed by itself in a slightly smaller mold than originally used to make the structure, and heat/pressure may be applied so the foam in the outer region (7) partially or completely-collapses.

In general, foam compositions are made by forming gas bubbles in a polymer mixture using a foaming (blowing) agent. As the bubbles form, the mixture expands and forms a foam composition having either an open or closed cellular structure. Flexible foams generally have an open cell structure, where the cells walls are incomplete and contain small holes through which liquid and air can permeate. Rigid foams generally have a closed cell structure, where the cell walls are continuous and complete. Many foams contain both open and closed cells. It also is possible to formulate flexible foams having a closed cell structure and likewise to formulate rigid foams having an open cell structure. Various thermoplastic and thermoset materials may be used in forming the foam compositions of this invention as discussed further below. In one preferred embodiment, a polyurethane foam composition is prepared.

The foaming (blowing) agents used to form the foam are typically are in the form of powder, pellets, or liquids and they are added to the composition, where they decompose or react during heating and generate gaseous by-products (for example, nitrogen or carbon dioxide). The gas is dispersed and trapped throughout the composition and foams it. For example, water may be used as the foaming agent. Air bubbles are introduced into the mixture of the isocyanate and polyol compounds and water by high-speed mixing equipment. As discussed in more detail further below, the isocyanates react with the water to generate carbon dioxide which fills and expands the cells created during the mixing process.

The chemical foaming agents may be inorganic, such as ammonium carbonate and carbonates of alkalai metals, or may be organic, such as azo and diazo compounds, such as nitrogen-based azo compounds. Suitable azo compounds include, but are not limited to, 2,2'-azobis(2-cyanobutane), 2,2'-azobis(methylbutyronitrile), and azodicarbonamide. Other compounds include, for example, p,p'-oxybis(benzene sulfonyl hydrazide), p-toluene sulfonyl semicarbazide, and p-toluene sulfonyl hydrazide. Other foaming agents include any of the Celogens® sold by Crompton Chemical Corporation, and nitroso compounds, sulfonylhydrazides, azides of organic acids and their analogs, triazines, tri- and tetrazole derivatives, sulfonyl semicarbazides, urea derivatives, guanidine derivatives, and esters such as alkoxyboroxines. Also, foaming agents that liberate gasses as a result of chemical interaction between components such as mixtures of acids and metals, mixtures of organic acids and inorganic carbonates, mixtures of nitriles and ammonium salts, and the hydrolytic decomposition of urea may be used. In the present invention, the foam composition preferably is formed from chemical blowing agents.

Chemical Blowing Agents.

One or more chemical blowing agents are added to the formulation that will be foamed. Water is a preferred blowing agent. When added to the polyurethane formulation, water will react with the isocyanate groups and form carbamic acid intermediates. The carbamic acids readily decarboxylate to form an amine and carbon dioxide. The newly formed amine can then further react with other isocyanate groups to form urea linkages and the carbon dioxide forms the bubbles to produce the foam. The water is added in a sufficient amount to cause the mixture to foam. In one preferred embodiment, the water is present in the composition in an amount in the range of 0.25 to 3.0% by weight based on total weight of the composition.

Physical Blowing Agents.

The physical blowing agents are different materials and have different working mechanisms than the chemical blowing agents. The physical blowing agents may be used, in addition to or as an alternative to, the chemical blowing agents. These blowing agents typically are gasses that are introduced under high pressure directly into the polymer composition. Chlorofluorocarbons (CFCs) and partially halogenated chlorofluorocarbons are effective, but these compounds are banned in many countries because of their environmental side effects. Alternatively, aliphatic and cyclic hydrocarbon gasses such as isobutene and pentane may be used. Inert gasses, such as carbon dioxide and nitrogen, also are suitable. With physical blowing agents, the isocyanate and polyol compounds react to form polyurethane linkages and the reaction generates heat. Foam cells are generated and as the foaming agent vaporizes, the gas becomes trapped in the cells of the foam.

Other suitable blowing agents may be selected, for example, from the group consisting of azo compounds such as azodicarbonamide (ADCA) and azobisformamide;

nitroso compounds such as N,N-dimethyl-N,N-dinitroso terephthalamide, N, N-dinitroso-pentamethylene-tetramine (DPT), and 5-Phenyltetrazole (5 PT); hydrazine derivatives such as 4,4'-Oxybis(benzenesulfonylhydrazide) (OBSH), hydrazodicarbonamide (HDCA), toluenesulfonyl hydrazide (TSH), and benzene-sulfonyl-hydrazide (BSH), carbazide compounds such as toluenesulfonyl-semicarbazide (TSH); and hydrogen carbonates such as sodium hydrogen carbonate ($NaHCO_3$); and mixtures thereof. In one preferred embodiment, chemical blowing agents having relatively low decomposition temperatures that complement the heating temperatures in the molding cycle are used. These blowing agents will start to decompose as the designated temperature in the molding process, and the foaming reaction will proceed more quickly. For example, the blowing agent may be selected from the group consisting of OBSH, having a decomposition temperature of about 160° C. and $NaHCO_3$ having a decomposition temperature of about 150° C. These blowing agents are commercially available from such companies as Tramaco, GmbH (Pinneberg, Germany) and Eiwa Chemical Ind. Co., Ltd. (Mitsubishi Gas Chemical America, Inc., Detroit, Mich.).

It is recognized that during the decomposition reaction of certain chemical foaming agents, more heat and energy is released than is needed for the reaction. Once the decomposition has started, it continues for a relatively long time period. If these foaming agents are used, longer cooling periods are generally required. Hydrazide and azo-based compounds often are used as exothermic foaming agents. On the other hand, endothermic foaming agents need energy for decomposition. Thus, the release of the gasses quickly stops after the supply of heat to the composition has been terminated. If the composition is produced using these foaming agents, shorter cooling periods are needed. Bicarbonate and citric acid-based foaming agents can be used as exothermic foaming agents.

Additional Blowing Agents.

Other suitable blowing agents that may be added to the formulation that will be foamed in accordance with this invention include, for example, expandable gas-containing microspheres. Exemplary microspheres consist of an acrylonitrile polymer shell encapsulating a volatile gas, such as isopentane gas. This gas is contained within the sphere as a blowing agent. In their unexpanded state, the diameter of these hollow spheres range from 10 to 17 µm and have a true density of 1000 to 1300 kg/m³. When heated, the gas inside the shell increases its pressure and the thermoplastic shell softens, resulting in a dramatic increase of the volume of the microspheres. Fully expanded, the volume of the microspheres will increase more than 40 times (typical diameter values would be an increase from 10 to 40 µm), resulting in a true density below 30 kg/m³ (0.25 lbs/gallon). Typical expansion temperatures range from 80-190° C. (176-374° F.). Such expandable microspheres are commercially available as Expancel® from Expancel of Sweden or Akzo Nobel.

In the process of this invention, the materials used to prepare the foam are charged to the mold for producing the inner core. The mold may be equipped with steam nozzles so that steam can be injected into the mold cavity. The temperature inside of the mold can vary, for example, the temperature can range from about 80° C. to about 400° C. Steam, hot air, hot water, or radiant heat may be used to foam the composition. The composition expands as it is heated. The temperature must be chosen carefully and must be sufficiently high so that it activates the blowing agents and foams the mixture, but it must not be excessively high. In general, the temperature should be in the range of about room temperature (RT) to about 180° F. and preferably in the range of about room temperature (RT) to about 150° F. so that it activates the blowing agents. Once the polymer materials, blowing agents, and any optional ingredients (for example, fillers) are charged to the mold and treated with sufficient heat and pressure, the blowing agents are activated. This causes the polymer mixture to foam and generate the foam composition in the mold.

Foam Polymers.

As discussed above, polyurethane foam is preferably prepared in accordance with this invention. It is recognized, however, that a wide variety of thermoplastic and thermoset materials may be used in forming the foam compositions of this invention including, for example, polyurethanes; polyureas; copolymers, blends and hybrids of polyurethane and polyurea; olefin-based copolymer ionomer resins (for example, Surlyn® ionomer resins and DuPont HPF® 1000 and HPF® 2000, commercially available from DuPont; Iotek® ionomers, commercially available from ExxonMobil Chemical Company; Amplify® IO ionomers of ethylene acrylic acid copolymers, commercially available from Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof.

Castable polyurethanes, polyureas, and hybrids of polyurethanes-polyureas are particularly desirable because these materials can be used to make a golf ball having good playing performance properties as discussed further below. By the term, "hybrids of polyurethane and polyurea," it is meant to include copolymers and blends thereof. Basically, polyurethane compositions contain urethane linkages formed by the reaction of a multi-functional isocyanate containing two or more NCO groups with a polyol having two or more hydroxyl groups (OH—OH) sometimes in the presence of a catalyst and other additives. Generally, polyurethanes can be produced in a single-step reaction (one-shot) or in a two-step reaction via a prepolymer or quasi-prepolymer. In the one-shot method, all of the components are combined at once, that is, all of the raw ingredients are added to a reaction vessel, and the reaction is allowed to take place. In the prepolymer method, an excess of polyisocyanate is first reacted with some amount of a polyol to form the prepolymer which contains reactive NCO groups. This prepolymer is then reacted again with a chain extender or curing agent polyol to form the final polyurethane. Polyurea compositions, which are distinct from the above-described polyurethanes, also can be formed. In general, polyurea compositions contain urea linkages formed by reacting an isocyanate group (—N=C=O) with an amine group (NH or NH$_2$). Polyureas can be produced in similar fashion to polyurethanes by either a one shot or prepolymer method. In forming a polyurea polymer, the polyol would be substituted with a suitable polyamine. Hybrid compositions containing urethane and urea linkages also may be produced. For example, when polyurethane prepolymer is reacted with amine-terminated curing agents during the chain-extending step, any excess isocyanate groups in the prepolymer will react with the amine groups in the curing agent. The resulting polyurethane-urea composition contains urethane and urea linkages and may be referred to as a hybrid. In another example, a hybrid composition may be produced when a polyurea prepolymer is reacted with a hydroxyl-terminated curing agent. A wide variety of isocyanates, polyols, polyamines, and curing agents can be used to form the polyurethane and polyurea compositions as discussed further below.

More particularly, the foam inner core of this invention may be prepared from a composition comprising an aromatic polyurethane, which is preferably formed by reacting an aromatic diisocyanate with a polyol. Suitable aromatic diisocyanates that may be used in accordance with this invention include, for example, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocyanate (NDI), naphthalene 2,4-diisocyanate (NDI), p-xylene diisocyanate (XDI), and homopolymers and copolymers and blends thereof. The aromatic isocyanates are able to react with the hydroxyl or amine compounds and form a durable and tough polymer having a high melting point. The resulting polyurethane generally has good mechanical strength and tear-resistance.

Alternatively, the foamed composition of the inner core may be prepared from a composition comprising aliphatic polyurethane, which is preferably formed by reacting an aliphatic diisocyanate with a polyol. Suitable aliphatic diisocyanates that may be used in accordance with this invention include, for example, isophorone diisocyanate (IPDI), 1,6-hexamethylene diisocyanate (HDI), 4,4'-dicyclohexylmethane diisocyanate ("H$_{12}$ MDI"), meta-tetramethylxylylene diisocyanate (TMXDI), trans-cyclohexane diisocyanate (CHDI), 1,3-bis(isocyanatomethyl)cyclohexane; 1,4-bis(isocyanatomethyl)cyclohexane; and homopolymers and copolymers and blends thereof. The resulting polyurethane generally has good light and thermal stability. Preferred polyfunctional isocyanates include 4,4'-methylene diphenyl diisocyanate (MDI), 2,4'-methylene diphenyl diisocyanate (MDI), and polymeric MDI having a functionality in the range of 2.0 to 3.5 and more preferably 2.2 to 2.5.

Any suitable polyol may be used to react with the polyisocyanate in accordance with this invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

As discussed further below, chain extenders (curing agents) are added to the mixture to build-up the molecular weight of the polyurethane polymer. In general, hydroxyl-terminated curing agents, amine-terminated curing agents, and mixtures thereof are used.

A catalyst may be employed to promote the reaction between the isocyanate and polyol compounds. Suitable catalysts include, but are not limited to, bismuth catalyst; zinc octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, tributylamine, 1,4-diaza(2,2,2)bicyclooctane, tetramethylbutane diamine, bis[2-dimethylaminoethyl] ether, N,N-dimethylaminopropylamine, N,N-dimethylcyclohexylamine, N,N,N',N',N"-pentamethyldiethylenetriamine, diethanolamine, dimethtlethanolamine, N-[2-(dimethylamino)ethyl]-N-methylethanolamine, N-ethylmorpholine, 3-dimethylamino-N,N-dimethylpropionamide, and N,N',N"-dimethylaminopropylhexahydrotriazine; organic acids such as oleic acid and acetic acid; delayed catalysts; and mixtures thereof. Zirconium-based catalysts such as, for example, bis(2-dimethyl aminoethyl) ether; mixtures of zinc complexes and amine compounds such as KKAT™ XK 614, available from King Industries; and amine catalysts such as Niax™ A-2 and A-33, available from Momentive Specialty Chemicals, Inc. are particularly preferred. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

In one preferred embodiment, as described above, water is used as the foaming agent—the water reacts with the polyisocyanate compound(s) and forms carbon dioxide gas which induces foaming of the mixture. The reaction rate of the water and polyisocyanate compounds affects how quickly the foam is formed as measured per reaction profile properties such as cream time, gel time, and rise time of the foam.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 1,3-bis-{2-[2-(2-hydroxyethoxy) ethoxy]ethoxy}cyclohexane; trimethylolpropane; polytetramethylene ether glycol (PTMEG), preferably having a molecular weight from about 250 to about 3900; and mixtures thereof. Di, tri, and tetra-functional polycaprolactone diols such as, 2-oxepanone polymer initiated with 1,4-butanediol, 2-ethyl-2-(hydroxymethyl)-1,3-propanediol, or 2,2-bis(hydroxymethyl)-1,3-propanediolsuch, may be used.

Suitable amine chain-extending (curing) agents that can be used in chain-extending the polyurethane prepolymer include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenylmethane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"), 4,4'-bis(sec-butylamino)-diphenylmethane, N,N'-dialkylamino-diphenylmethane, trimethyleneglycol-di(p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methyl-imino-bis(propylamine) (i.e., N-(3-aminopropyl)-N-methyl-1,3-propanediamine), 1,4-bis(3-aminopropoxy)butane (i.e., 3,3'-[1,4-butanediylbis-(oxy)bis]-1-propanamine), diethyleneglycol-bis(propylamine) (i.e., diethyleneglycol-di(aminopropyl)ether), 4,7,10-trioxatridecane-1,13-diamine, 1-methyl-2,6-diamino-cyclohexane, 1,4-diamino-cyclohexane, poly(oxyethylene-oxypropylene) diamines, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, 3,3'-diethyl-5,5'-dichloro-4,4'-diamino-dicyclohexylmethane, polytetramethylene ether diamines, 3,3',5,5'-tetraethyl-4,4'-diamino-dicyclohexylmethane (i.e., 4,4'-methylene-bis(2,6-diethylaminocyclohexane)), 3,3'-dichloro-4,4'-diamino-dicyclohexylmethane, 2,2'-dichloro-3,3',5,5'-tetraethyl-4,4'-diamino-dicyclohexylmethane, (ethylene oxide)-capped polyoxypropylene ether diamines, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine (i.e., $N_3$-amine), glycerin-based triamines, (all saturated); tetramines such as N,N'-bis(3-aminopropyl)ethylene diamine (i.e., $N_4$-amine) (both saturated), triethylene tetramine; and other polyamines such as tetraethylene pentamine (also saturated). One suitable amine-terminated chain-extending agent is Ethacure 300™ (dimethylthiotoluenediamine or a mixture of 2,6-diamino-3,5-dimethylthiotoluene and 2,4-diamino-3,5-dimethylthiotoluene.) The amine curing agents used as chain extenders normally have a cyclic structure and a low molecular weight (250 or less).

When a hydroxyl-terminated curing agent is used, the resulting polyurethane composition contains urethane linkages. On the other hand, when an amine-terminated curing agent is used, any excess isocyanate groups will react with the amine groups in the curing agent. The resulting polyurethane composition contains urethane and urea linkages and may be referred to as a polyurethane/urea hybrid.

In addition to the polymer and foaming agent, the foam composition also may include other ingredients such as, for example, fillers, cross-linking agents, chain extenders, surfactants, dyes and pigments, coloring agents, fluorescent agents, adsorbents, stabilizers, softening agents, impact modifiers, antioxidants, antiozonants, and the like. The formulations used to prepare the polyurethane foam compositions of this invention preferably contain a polyol, polyisocyanate, water, an amine or hydroxyl curing agent, surfactant, and a catalyst as described further below.

Fillers.

The foam composition may contain fillers such as, for example, mineral filler particulate. Suitable mineral filler particulates include compounds such as zinc oxide, limestone, silica, mica, barytes, lithopone, zinc sulfide, talc, calcium carbonate, magnesium carbonate, clays, powdered metals and alloys such as bismuth, brass, bronze, cobalt, copper, iron, nickel, tungsten, aluminum, tin, precipitated hydrated silica, fumed silica, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate. Silicon dioxides are particularly preferred because they are based on Si—O bonds and these material are compatible with the Si—O—Si backbone of the silicone foam. Adding fillers to the composition provides many benefits including helping improve the stiffness and strength of the composition. The mineral fillers tend to help decrease the size of the foam cells and increase cell density. The mineral fillers also tend to help improve the physical properties of the foam such as hardness, compression set, and tensile strength.

More particularly, clay particulate fillers, such as Garamite® mixed mineral thixotropes and Cloisite® and Nanofil® nanoclays, commercially available from Southern Clay Products, Inc., and Nanomax® and Nanomer® nanoclays, commercially available from Nanocor, Inc may be used. Other nano-scale materials such as nanotubes and nanoflakes also may be used. Also, talc particulate (e.g., Luzenac HAR® high aspect ratio talcs, commercially available from Luzenac America, Inc.), glass (e.g., glass flake, milled glass, and microglass), and combinations thereof may be used. Metal oxide fillers have good heat-stability and include, for example, aluminum oxide, zinc oxide, tin oxide, barium sulfate, zinc sulfate, calcium oxide, calcium carbonate, zinc carbonate, barium carbonate, tungsten, tungsten carbide, and lead silicate fillers. These metal oxides and other metal fillers such as, for example, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be added to the silicone foam composition.

As discussed further below, in one preferred embodiment, the specific gravity (or density) of the foam inner core is less than the specific gravity of the outer core. In this embodiment, if an excess amount of mineral filler or other additives are included in the foam composition, they should not be added in an amount that would increase the specific gravity (or density) of the foam inner core to a level such that it would be greater than the specific gravity of the outer core layer. If the ball's mass is concentrated towards the outer surface (for example, outer core layers), and the outer core layer has a higher specific gravity than the inner core, the ball has a relatively high Moment of Inertia (MOI). In such balls, most of the mass is located away from the ball's axis of rotation and thus more force is needed to generate spin. These balls have a generally low spin rate as the ball leaves the club's face after contact between the ball and club. Such core structures (wherein the specific gravity of the outer core is greater than the specific gravity of the inner core) are preferred in the present invention. Thus, in one preferred embodiment, the concentration of mineral filler particulate in the foam composition is in the range of about 0.1 to about 9.0% by weight.

Molding of Outer Core Over the Inner Core

As discussed above, the inner core (center) is made preferably from a foamed polyurethane composition. Preferably, a two-layered or dual-core is made, wherein the inner core is surrounded by an outer core layer. In one preferred embodiment, the outer core layer is formed from a non-foamed thermoset composition and more preferably from a non-foamed thermoset rubber composition.

In the present invention, the inner core (center) of the golf ball comprises a foam thermoplastic or thermoset polymer composition that may be prepared using the above-described methods. Preferably, the center comprises a polyurethane foam composition. The foam may have an open or closed cellular structure or combinations thereof and may range from relatively rigid foam to very flexible foam. Referring back to FIG. 1, a foamed inner core (4) having a geometric center (6), surrounding outer region (7), and outer surface skin (8) is shown. The foamed inner core structure (4) may be produced using the molding methods described further below.

Figure 2:
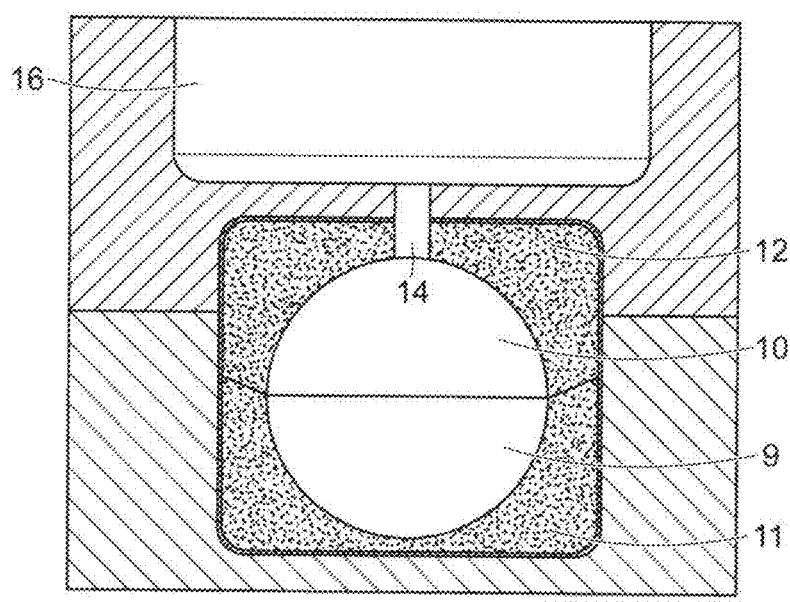
FIG. 2 is a perspective view of one embodiment of upper and lower mold cavities used to make the inner core of the present invention.

Referring to FIG. 2, one version of a mold for preparing the foamed inner core is shown. The mold includes lower and upper mold cavities (9, 10) that are placed in lower and upper mold frame plates (11, 12). The frame plates (11, 12) contain guide pins and complementary alignment holes (not shown in drawing). The guide pins are inserted into the alignment holes to secure the lower plate (11) to the upper plate (12). The lower and upper mold cavities (9, 10) are mated together as the frame plates (11, 12) are fastened. When the lower and upper mold cavities (9, 10) are joined together, they define an interior spherical cavity that houses the spherical core. The upper mold contains a vent or hole (14) to allow for the expanding foam to fill the cavities uniformly. A secondary overflow chamber (16), which is located above the vent (14), can be used to adjust the amount of foam overflow and thus adjust the density of the core structure being molded in the cavities. As the lower and upper mold cavities (9, 10) are mated together and sufficient heat and pressure is applied, the reactants of the foam composition react, cure, and solidify to form a relatively rigid or flexible and lightweight spherical foam core. The resulting cores are cooled and then removed from the mold.

The materials used to prepare the foam are charged to the mold for producing the inner core. The mold may be equipped with steam nozzles so that steam can be injected into the mold cavity. The temperature inside of the mold can vary, for example, the temperature can range from about 80° C. to about 400° C. Steam, hot air, hot water, or radiant heat may be used to foam the composition. The composition expands as it is heated. The temperature must be chosen carefully and must be sufficiently high so that it activates the blowing agents and foams the mixture. In general, the temperature should be in the range of about 80° C. to about 250° C. and preferably in the range of about 90° C. to about 220° C. so that it activates the blowing agents.

Once the polymer materials, blowing agent, and any optional ingredients (for example, fillers) are charged to the mold and treated with sufficient heat and pressure, the blowing agents are activated. Water is a preferred chemical blowing agent. When added to the polyurethane formulation that will be foamed, water will react with the isocyanate groups and form carbamic acid intermediates. The carbamic acids readily decarboxylate to form an amine and carbon dioxide. The newly formed amine can then further react with other isocyanate groups to form urea linkages and the carbon dioxide forms the bubbles to produce the foam.

As discussed above, the inner core structure (4) that is molded from a foam composition includes foamed geometric center and outer regions (6, 7) and a non-foamed outer skin (8). In practice, the reactants for producing the foamed composition are added to a spherical mold. As the reaction progresses, the foaming material starts to generate carbon dioxide gas that will fill the foam cells. This gas is trapped inside the polymer cellular network and expands the foaming material. Once the expanding foamed article hits the walls of the mold cavity, the foam cannot expand anymore due to the physical constraints of the cavity. This physical constraint causes a higher density region at the interface of the cavity, while the center of the foamed article remains at a lower density with more dispersed gas bubbles. There is also a temperature difference between the outer surface of the foamed article that hits the cavity walls and center of the foamed article. As a result of this temperature difference, less carbon dioxide gas for filling the cells is generated at the outer region than the center region of the foaming material. Thus, a non-foamed, relatively dense skin layer is formed on the outer surface of the foamed article. Vents may be added to the spherical mold of various sizes and shapes so that more or less pressure may be built up in the cavity and the thickness of the outer skin layer can be tailored.

In a second step, the foamed inner core (4) is treated thermally or chemically to at least partially-collapse the foam in the outer region (7). For example, in an over-molding process, the outer core layer (5) is prepared by molding the outer core composition over the inner core (4). The outer core layer (5) may be molded over the foamed inner core (4) using a variety of molding techniques. Suitable thermoset and thermoplastic materials that may be used to form the outer core layer are described further below.

Figure 3:
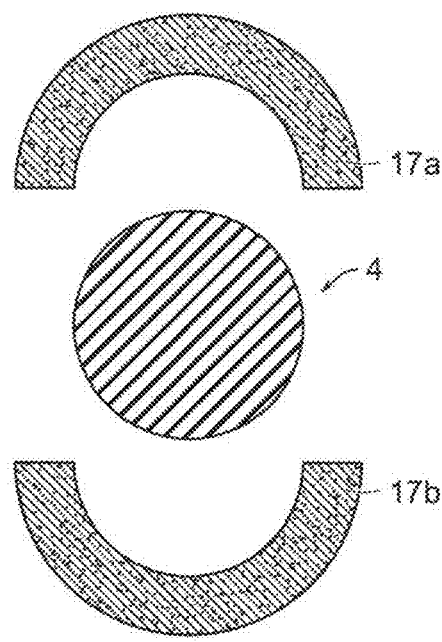
FIG. 3 is a perspective view of a spherical inner core made of a foamed composition and two half-shells made of a thermoset rubber composition in accordance with the present invention.
Figure 3A:
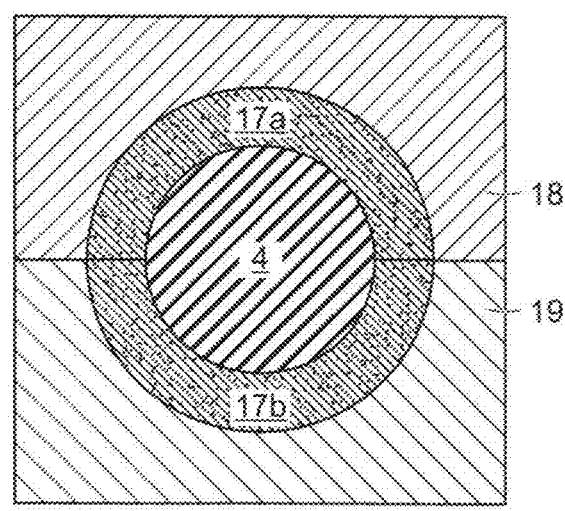
FIG. 3A is a perspective view of one embodiment of upper and lower mold cavities used to mold the outer core layer so that it encapsulates the inner core of FIG. 3 in accordance with the present invention.

For example, the outer core composition (preferably a thermoset rubber composition) may be injection-molded or compression-molded to produce half-shells. These smooth-surfaced or textured hemispherical shells are then placed around the foamed, spherical inner core in a compression mold. Under sufficient heating and pressure, the shells fuse together to form an outer core layer that encapsulates the foamed inner core. More particularly, as shown in FIGS. 3 and 3A, after the two half-shells (17a 17b) made from a rubber or other composition have been prepared, they are joined together in a mold to encase the previously molded inner core (4). The hemispherical shells (17a, 17b) and inner core (4) are placed in a mold between a first mold member (17a) and a second mold member (17b). The first and second mold members (19, 19) are subsequently pressed together to join together the half-shells (17a, 17b) under sufficient heat and pressure. This molding process forms the outer core layer. As a result, a finished core assembly (inner core and surrounding outer core layer) is produced.

In another method, the outer core composition may be added to an injection-molding machine. After the foamed inner core has been positioned properly in the injection-molding cavity, the outer core composition is injection-molded directly over the inner core.

Referring back to FIGS. 1 and 1A, during over-molding of the foamed inner core (4) center with the outer core layer composition (5), the heat used in the molding cycle activates/decomposes the foamed outer region (7) of the inner core. This step causes the outer region (7) to at least partially collapse. In turn, the partially-collapsed foamed outer region (7) becomes at least partially non-foamed. The outer region (7) becomes more solid and dense (that is, less foamed). In some instances, the foamed outer region (7) collapses completely and becomes completely non-foamed. The properties of the different inner core regions may change. For example, in one preferred embodiment, the hardness of the partially or completely foam-collapsed outer region (7a) becomes greater than the hardness of the foamed center (6a) to create a positive hardness gradient across the inner core structure (4a). The outer skin (8a) of the foamed inner core (4a) also has hardness. These hardness gradients are discussed in further detail below. The outer core layer (5), which is formed during the over-molding step, encapsulates the foamed inner core (4a).

Figure 4:
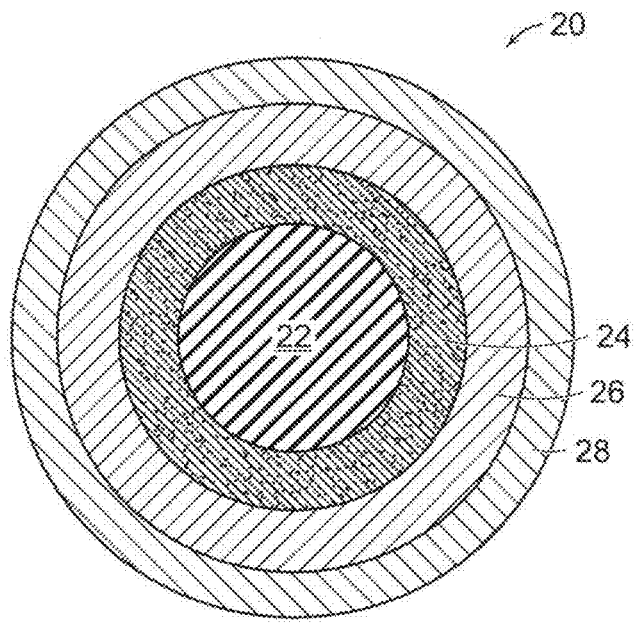
FIG. 4 is a cross-sectional view of a four-piece golf ball having a dual-layered core made in accordance with the present invention.
Figure 5:
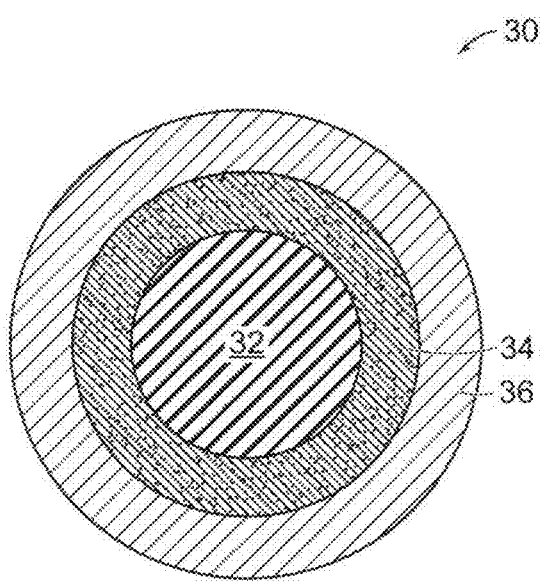
FIG. 5 is a cross-sectional view of a three-piece golf ball having a dual-layered core made in accordance with the present invention.

As discussed above, a dual-layered core assembly comprising an inner core (4a) and outer core layer (5) is formed in accordance with this invention. The core assembly is used to manufacture a finished golf ball. For example, referring to FIG. 4, in one version, a four-piece golf ball generally indicated at (20) can be made in accordance with this invention. The ball (20) contains an inner core (center) (22) and surrounding outer core layer (24). The dual-core sub-assembly is encased by a multi-layered cover comprising an inner cover (26) and outer cover (28). Referring to FIG. 5, in another version, a three-piece golf ball (30) contains an inner core (center) (32) and outer core layer (34). The dual-core sub-assembly is surrounded by a single-layered cover (36).

In an alternative process, the inner core may be chemically or thermally treated in a separate step. For example, a fully-cured foamed inner core sphere may be put into the same sized mold as that sized mold originally used to make the inner core sphere. Then, the inner core in the mold may be exposed to heat such that the outer surface of the foamed composition partially-melts and collapses to form an outer region with a greater density that that of the geometric center region. In yet another method, the mold could be slightly smaller than the original mold and the fully-cured foamed sphere may be exposed to heat, pressure, or both in order to create the partially-collapsed outer region of greater density. A chemical-treatment may also be used to form an outer region of greater density. For example, the foamed sphere may be exposed to a solvent that partially dissolves or softens the outer portion of the sphere in order to cause it to collapse slightly. It is also possible to treat the foamed sphere with a reactive mixture such as polyurethane, polyurea, epoxy, or other reactive polymer system. The liquid, non-reacted mixture can fill the voids of the outer portion of the foamed sphere and react to form a solid material. In this manner, the density of the outer portion of the foamed sphere can be increased.

Properties of Foams

The foam compositions of this invention have numerous chemical and physical properties making them suitable for core assemblies in golf balls.

The density of the foam is an important property and is defines as the weight per unit volume (typically, $g/cm^3$) and can be measured per ASTM D-1622. The hardness, stiffness, and load-bearing capacity of the foam are independent of the foam's density, although foams having a high density typically have high hardness and stiffness. Normally, foams having higher densities have higher compression strength. Surprisingly, the foam compositions used to produce the inner core of the golf balls per this invention have a relatively low density; however, the foams are not necessarily soft and flexible, rather, they may be relatively firm, rigid, or semi-rigid depending upon the desired golf ball properties. Tensile strength, tear-resistance, and elongation generally refer to the foam's ability to resist breaking or tearing, and these properties can be measured per ASTM D-1623. The durability of foams is important, because introducing fillers and other additives into the foam composition can increase the tendency of the foam to break or tear apart. In general, the tensile strength of the foam compositions of this invention is in the range of about 20 to about 1000 psi (parallel to the foam rise) and about 50 to about 1000 psi (perpendicular to the foam rise) as measured per ASTM D-1623 at 23° C. and 50% relative humidity (RH). Meanwhile, the flex modulus of the foams of this invention is generally in the range of about 5 to about 45 kPa as measured per ASTM D-790, and the foams generally have a compressive modulus of 200 to 50,000 psi.

In another test, compression strength is measured on an Instron machine according to ASTM D-1621. The foam is cut into blocks and the compression strength is measured as the force required to compress the block by 10%. In general, the compressive strength of the foam compositions of this invention is in the range of about 100 to about 1800 psi (parallel and perpendicular to the foam rise) as measured per ASTM D-1621 at 23° C. and 50% relative humidity (RH). The test is conducted perpendicular to the rise of the foam or parallel to the rise of the foam. The Percentage (%) of Compression Set also can be used. This is a measure of the permanent deformation of a foam sample after it has been compressed between two metal plates under controlled time and temperature condition (standard—22 hours at 70° C. (158° F.)). The foam is compressed to a thickness given as a percentage of its original thickness that remained "set." Preferably, the Compression Set of the foam is less than ten percent (10%), that is, the foam recovers to a point of 90% or greater of its original thickness.

Hardness of the Inner Core

As shown in FIGS. 1-1B, a foamed inner core (4a) having a foamed geometric center (6a) and outer skin (8a) and a surrounding outer core layer (5) may be prepared per the molding method discussed above. The foamed inner core (4a) also includes a partially or completely non-foamed outer region (7a) that acts as a transition zone between the foamed center (6a) and outer skin (8a).

The inner core preferably has a diameter within a range of about 0.150 to about 1.120 inches. For example, the inner core may have a diameter within a range of about 0.300 to about 1.000 inches. In another example, the inner core may have a diameter within a range of about 0.500 to about 0.800 inches. More particularly, the inner core preferably has a diameter size with a lower limit of about 0.15 or 0.17 or 0.25 or 0.30 or 0.35 or 0.38 or 0.45 or 0.50 or 0.52 or 0.55 inches and an upper limit of about 0.60 or 0.63 or 0.65 or 0.70 or 0.74 or 0.80 or 0.86 or 0.90 or 0.95 or 1.00 or 1.02 or 1.08 or 1.12 inches. In FIG. 1A, the foamed inner core (4a) includes a geometric center (6a), surrounding outer region (7a), and outer skin surface (8a). The thickness of the surrounding outer region (7a) is preferably in the range of about 0.010 inches (10 mils) to about 0.550 inches (550 mils). In one preferred embodiment, the thickness of outer region (7a) is preferably in the range of about 0.020 to about 0.440 inches and more preferably in the range of about 0.030 to about 0.250 inches.

In one preferred embodiment, the foamed core has a "positive" hardness gradient (that is, the outer skin of the inner core is harder than its geometric center.) For example, the geometric center hardness of the inner core ($H_{inner\ core\ center}$), as measured in Shore C units, may be about 10 Shore C or greater and preferably has a lower limit of about 10 or 13 or 16 or 20 or 25 or 30 or 32 or 34 or 36 or 40 Shore C and an upper limit of about 42 or 44 or 48 or 50 or 52 or 56 or 60 or 62 or 65 or 68 or 70 or 74 or 78 or 80 or 84 or 90 Shore C. In one preferred version, the $H_{inner\ core\ center}$ of the foamed inner core is about 40 Shore C.

When a flexible, relatively soft foam is used, the geometric center hardness of the inner core ($H_{inner\ core\ center}$) of the foam may have a Shore A hardness of about 10 or greater, and preferably has a lower limit of 15, 18, 20, 25, 28, 30, 35, 38, or 40 Shore A hardness and an upper limit of about 45 or 48, or 50, 54, 58, 60, 65, 70, 80, 85, or 90 Shore A hardness. In one preferred embodiment, the $H_{inner\ core\ center}$ of the foamed inner core is about 55 Shore A.

The $H_{inner\ core\ center}$, as measured in Shore D units, is about 5 Shore D or greater and more preferably within a range having a lower limit of about 5 or 8 or 12 or 15 or 18 or 20 or 22 or 25 or 28 or 30 or 32 or 36 or 40 or 44 Shore D and an upper limit of about 45 or 48 or 50 or 52 or 55 or 58 or 60 or 62 or 64 or 66 or 70 or 72 or 74 or 78 or 80 or 82 or 84 or 88 or 90 Shore D.

Meanwhile, the hardness of the outer region of the inner core ($H_{midpoint\ of\ inner\ core\ outer\ region}$) also may be measured. The hardness of the midpoint of the outer region ($H_{midpoint\ of\ inner\ core\ outer\ region}$) may be taken at a point equidistant from the geometric center and outer surface skin. The $H_{midpoint\ of\ inner\ core\ outer\ region}$, as measured in Shore C, is preferably about 12 Shore C or greater and may have, for example, a lower limit of about 12 or 15 or 18 or 20 or 22 or 24 or 28 or 30 or 32 or 35 or 36 or 40 or 42 or 44 or 48 or 50 Shore C and an upper limit of about 52 or 55 or 58 or 60 or 62 or 64 or 66 or 70 or 74 or 78 or 80 or 86 or 88 or 90 or 92 or 95 Shore C. When a flexible, relatively soft foam is used, the $H_{midpoint\ of\ inner\ core\ outer\ region}$ of the foam may have a Shore A hardness of about 10 or greater, and preferably has a lower limit of 10, 12 15, 16, 20, 24, 26, 28, 30, 34, 40, 42, 46, or 50 Shore A hardness and an upper limit of about 52, 55, 58, 60, 62, 66, 70, 74, 78, 80, 84, 88, 90, or 95 Shore A hardness. In one preferred embodiment, the $H_{midpoint\ of\ inner}$ core outer region is about 60 Shore A. The $H_{midpoint\ of\ inner\ core\ outer\ region}$, as measured in Shore D units, preferably has a lower limit of about 10 or 12 or 16 or 22 or 28 or 30 or 32 or 36 or 40 or 44 Shore D and an upper limit of about 45 or 48 or 50 or 52 or 55 or 58 or 60 or 62 or 64 or 66 or 70 or 74 or 78 or 80 or 82 or 84 or 88 or 90 or 94 or 96 Shore D.

Also, the hardness of the outer skin surface of the inner core ($H_{inner\ core\ surface}$), as measured in Shore C, is preferably about 25 Shore C or greater and may have, for example, a lower limit of about 25 or 27 or 31 or 33 or 35 or 38 or 41 or 43 or 44 or 47 or 50 Shore C and an upper limit of about 55 or 61 or 63 or 65 or 73 or 77 or 80 or 82 or 83 or 93 or 95 or 98 Shore C. When a flexible, relatively soft foam is used, the $H_{inner\ core\ surface}$ of the foam may have a Shore A hardness of about 18 or greater, and preferably has a lower limit of 18, 20, 27, 29, 30, 33, 40, 45, or 50 Shore A hardness and an upper limit of about 55, 58, 61, 66, 70, 77, 80, 84, 87, 93, or 95 Shore A hardness. In one preferred embodiment, the $H_{inner\ core\ surface}$ is about 65 Shore A. The $H_{inner\ core\ surface}$, as measured in Shore D units, preferably has a lower limit of about 28 or 30 or 32 or 36 or 40 or 44 Shore D and an upper limit of about 45 or 48 or 50 or 52 or 55 or 61 or 65 or 70 or 73 or 80 or 83 or 88 or 90 or 93 Shore D.

In one preferred embodiment, the foamed inner core has a midpoint hardness in the outer region ($H_{midpoint\ inner\ core\ outer\ region}$), wherein the $H_{inner\ core\ surface}$ is greater than the $H_{midpoint\ inner\ core\ outer\ region}$ and the $H_{midpoint\ inner\ core\ outer\ region}$ is greater than the $H_{inner\ core\ center}$. Thus, in one instance, the $H_{inner\ core\ surface} > H_{midpoint\ inner\ core\ outer\ region} > H_{inner\ core\ center}$.

Density of the Inner Core

The foamed inner core preferably has a specific gravity of about 0.20 to about 1.50 g/cc. That is, the density of the inner core (as measured at any point of the inner core structure) is preferably within the range of about 0.20 to about 1.50 g/cc. By the term, "specific gravity of the inner core" ("$SG_{inner}$"), it is generally meant the specific gravity of the inner core as measured at any point of the inner core structure. It should be understood, however, that the specific gravity values, as taken at different particular points of the inner core structure, may vary. For example, the foamed inner core may have a "positive" density gradient (that is, the outer surface (skin) of the inner core may have a density greater than the geometric center of the inner core.) In one preferred version, the specific gravity of the geometric center of the inner core ($SG_{center\ of\ inner\ core}$) is less than 0.80 g/cc and more preferably less than 0.70 g/cc. More particularly, in one version, the ($SG_{center\ of\ inner\ core}$) is in the range of about 0.10 to about 0.06 g/cc. For example, the ($SG_{center\ of\ inner\ core}$) may be within a range having a lower limit of about 0.10 or 0.15 of 0.20 or 0.24 or 0.30 or 0.35 or 0.37 or 0.40 or 0.42 or 0.45 or 0.47 or 0.50 and an upper limit of about 0.60 or 0.65 or 0.70 or 0.74 or 0.78 or 0.80, or 0.82 or 0.84 or 0.85 or 0.88 or 0.90 g/cc.

Meanwhile, the specific gravity of the outer surface (skin) of the inner core ($SG_{skin\ of\ inner\ core}$), in one preferred version, is greater than about 0.90 g/cc and more preferably greater than 1.00 g/cc. For example, the ($SG_{skin\ of\ inner\ core}$) may fall within the range of about 0.90 to about 1.25 g/cc. More particularly, in one version, the ($SG_{skin\ of\ inner\ core}$) may have a specific gravity with a lower limit of about 0.90 or 0.92 or 0.95 or 0.98 or 1.00 or 1.02 or 1.06 or 1.10 g/cc and an upper limit of about 1.12 or 1.15 or 1.18 or 1.20 or 1.24 or 1.30 or 1.32 or 1.35 g/cc. In other instances, the outer skin may have a specific gravity of less than 0.90 g/cc. For example, the specific gravity of the outer skin ($SG_{skin\ of\ inner\ core}$) may be about 0.75 or 0.80 or 0.82 or 0.85 or 0.88 g/cc. In such instances, wherein both the ($SG_{center\ of\ inner\ core}$) and ($SG_{skin\ of\ inner\ core}$) are less than 0.90 g/cc, it is still preferred that the ($SG_{center\ of\ inner\ core}$) be less than the ($SG_{skin\ of\ inner\ core}$).

As discussed above, the foamed inner core may have an outer surface specific gravity ($SG_{inner\ core\ surface}$) and a center specific gravity ($SG_{inner\ core\ center}$), wherein the $SG_{inner\ core\ surface}$ is greater than the $SG_{inner\ core\ center}$. In one preferred embodiment, the foamed inner core has a midpoint specific gravity in the outer region ($SG_{midpoint\ inner\ core\ outer\ region}$), wherein the $SG_{inner\ core\ surface}$ is greater than the $SG_{midpoint\ inner\ core\ outer\ region}$ and the $SG_{midpoint\ inner\ core\ outer\ region}$ is greater than the $SG_{inner\ core\ center}$. Thus, in one instance, the $SG_{inner\ core\ surface} > SG_{midpoint\ inner\ core\ outer\ region} > SG_{inner\ core\ center}$.

Thermoset Materials

As discussed above, the inner core (center) is made preferably from a foamed polyurethane composition. Preferably, a two-layered or dual-core is made, wherein the inner core is surrounded by an outer core layer. In one preferred embodiment, the outer core layer is formed from a non-foamed thermoset composition and more preferably from a non-foamed thermoset rubber composition.

Suitable thermoset rubber materials that may be used to form the outer core layer include, but are not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. Preferably, the outer core layer is formed from a polybutadiene rubber composition.

The thermoset rubber composition may be cured using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions may further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber composition also may include filler(s) such as materials selected from carbon black, clay and nanoclay particles as discussed above, talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. Metal fillers such as, for example, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof also may be added to the rubber composition to adjust the specific gravity of the composition as needed. As discussed further below, in one preferred embodiment, the specific gravity of the inner core layer (for example, foamed polyurethane) has a specific gravity less than the outer core layer (for example, polybutadiene rubber). In such an event, if mineral, metal, or other fillers are added to the polybutadiene rubber composition used to form the outer core, it is important the concentration of such fillers be sufficient so that the specific gravity of the outer core layer is greater than the specific gravity of the inner core. For example, the concentration of the fillers may be in an amount of at least about 5% by weight based on total weight of composition In addition, the rubber compositions may include antioxidants. Also, processing aids such as high molecular weight organic acids and salts thereof may be added to the composition. Suitable organic acids are aliphatic organic acids, aromatic organic acids, saturated mono-functional organic acids, unsaturated monofunctional organic acids, multi-unsaturated mono-functional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, and dimerized derivatives thereof. The organic acids are aliphatic, mono-functional (saturated, unsaturated, or multi-unsaturated) organic acids. Salts of these organic acids may also be employed. The salts of organic acids include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending.) Other ingredients such as accelerators (for example, tetra methylthiuram), processing aids, dyes and pigments, wetting agents, surfactants, plasticizers, coloring agents, fluorescent agents, chemical blowing and foaming agents, defoaming agents, stabilizers, softening agents, impact modifiers, antiozonants, as well as other additives known in the art may be added to the rubber composition.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 7105, KBR 710H, and KBR 750, available from Kumho Petrochemical Co., Ltd. Of Seoul, South Korea; and DIENE 55NF, 70AC, and 320 AC, available from Firestone Polymers of Akron, Ohio.

The polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. Preferably, the concentration of polybutadiene rubber is about 40 to about 95 weight percent. If desirable, lesser amounts of other thermoset materials may be incorporated into the base rubber. Such materials include the rubbers discussed above, for example, cis-polyisoprene, trans-polyisoprene, balata, polychloroprene, polynorbornene, polyoctenamer, polypentenamer, butyl rubber, EPR, EPDM, styrene-butadiene, and the like.

Thermoplastic Materials

As discussed above, in one preferred embodiment, a thermoset rubber composition is used to form the outer core. In alternative embodiments, the outer core layer is made from a thermoplastic material, which is preferably non-foamed, for example, a non-foamed ionomer composition.

Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70% of all acid groups present in the composition are neutralized.

Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred α,β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$ α,β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth)

acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α,β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals. The amount of cation used in the composition is readily determined based on desired level of neutralization. As discussed above, for HNP compositions, the acid groups are neutralized to 70% or greater, preferably 70 to 100%, more preferably 90 to 100%. In one embodiment, an excess amount of neutralizing agent, that is, an amount greater than the stoichiometric amount needed to neutralize the acid groups, may be used. That is, the acid groups may be neutralized to 100% or greater, for example 110% or 120% or greater. In other embodiments, partially-neutralized compositions are prepared, wherein 10% or greater, normally 30% or greater of the acid groups are neutralized. When aluminum is used as the cation source, it is preferably used at low levels with another cation such as zinc, sodium, or lithium, since aluminum has a dramatic effect on melt flow reduction and cannot be used alone at high levels. For example, aluminum is used to neutralize about 10% of the acid groups and sodium is added to neutralize an additional 90% of the acid groups.

In a particular embodiment, the core includes at least one additional thermoplastic intermediate core layer formed from a composition comprising an ionomer selected from DuPont® HPF ESX 367, HPF 1000, HPF 2000, HPF AD1035, HPF AD1035 Soft, HPF AD1040, and AD1172 ionomers, commercially available from E. I. du Pont de Nemours and Company. The coefficient of restitution ("COR"), compression, and surface hardness of each of these materials, as measured on 1.55" injection molded spheres aged two weeks at 23° C./50% RH, are given in Table 1 below.

TABLE 1

| Example | Solid Sphere COR | Solid Sphere Compression | Solid Sphere Shore D Surface Hardness |
|---|---|---|---|
| HPF 1000 | 0.830 | 115 | 54 |
| HPF 2000 | 0.860 | 90 | 47 |
| HPF AD1035 | 0.820 | 63 | 42 |
| HPF AD1035 Soft | 0.780 | 33 | 35 |
| HPF AD 1040 | 0.855 | 135 | 60 |
| HPF AD1172 | 0.800 | 32 | 37 |

In another particular embodiment, the core includes at least one additional thermoplastic intermediate core layer formed from a blend of two or more ionomers. In a particular aspect of this embodiment, the blend is a 50 wt %/50 wt % blend of two different partially-neutralized ethylene/methacrylic acid copolymers.

In another particular embodiment, the core includes at least one additional thermoplastic intermediate core layer formed from a blend of one or more ionomers and a maleic anhydride-grafted non-ionomeric polymer. In a particular aspect of this embodiment, the non-ionomeric polymer is a metallocene-catalyzed polymer. In another particular aspect of this embodiment, the blend includes a partially-neutralized ethylene/methacrylic acid copolymer and a maleic anhydride-grafted metallocene-catalyzed polyethylene.

In yet another particular embodiment, the core includes at least one additional thermoplastic intermediate core layer formed from a composition selected from the group consisting of partially- and fully-neutralized ionomers optionally blended with a maleic anhydride-grafted non-ionomeric polymer; polyester elastomers; polyamide elastomers; and combinations of two or more thereof.

"Ionic plasticizers" such as organic acids or salts of organic acids, particularly fatty acids, may be added to the ionomer resin. Such ionic plasticizers are used to make conventional ionomer composition more processable as described in Rajagopalan et al., U.S. Pat. No. 6,756,436, the disclosure of which is hereby incorporated by reference. In the present invention such ionic plasticizers are optional. In one preferred embodiment, a thermoplastic ionomer composition is made by neutralizing about 70 wt % or more of the acid groups without the use of any ionic plasticizer. On the other hand, in some instances, it may be desirable to add a small amount of ionic plasticizer, provided that it does not adversely affect the heat-resistance properties of the composition. For example, the ionic plasticizer may be added in an amount of about 10 to about 50 weight percent (wt. %) of the composition, more preferably 30 to 55 wt. %.

The organic acids may be aliphatic, mono- or multi-functional (saturated, unsaturated, or multi-unsaturated) organic acids. Salts of these organic acids may also be employed. Suitable fatty acid salts include, for example, metal stearates, laureates, oleates, palmitates, pelargonates, and the like. For example, fatty acid salts such as zinc stearate, calcium stearate, magnesium stearate, barium stearate, and the like can be used. The salts of fatty acids are generally fatty acids neutralized with metal ions. The metal cation salts provide the cations capable of neutralizing (at varying levels) the carboxylic acid groups of the fatty acids. Examples include the sulfate, carbonate, acetate and hydroxide salts of metals such as barium, lithium, sodium, zinc, bismuth, chromium, cobalt, copper, potassium, strontium, titanium, tungsten, magnesium, cesium, iron, nickel, silver, aluminum, tin, or calcium, and blends thereof. It is preferred the organic acids and salts be relatively non-migratory (they do not bloom to the surface of the polymer under ambient temperatures) and non-volatile (they do not volatilize at temperatures required for melt-blending).

Other suitable thermoplastic polymers that may be used to form the inner cover layer include, but are not limited to, the following polymers (including homopolymers, copolymers, and derivatives thereof): (a) polyesters, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof; (b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof; (c) polyurethanes, polyureas, polyurethane-polyurea hybrids, and blends of two or more thereof; (d) fluoropolymers, such as those disclosed in U.S. Pat. Nos. 5,691,066, 6,747,110 and 7,009,002, the entire disclosures of which are hereby incorporated herein by reference, and blends of two or more thereof; (e) polystyrenes, such as poly(styrene-co-maleic anhydride), acrylonitrile-butadiene-styrene, poly(styrene sulfonate), polyethylene styrene, and blends of two or more thereof; (f) polyvinyl chlorides and grafted polyvinyl chlorides, and blends of two or more thereof; (g) polycarbonates, blends of polycarbonate/acrylonitrile-butadiene-styrene, blends of polycarbonate/polyurethane, blends of polycarbonate/polyester, and blends of two or more thereof; (h) polyethers, such as polyarylene ethers, polyphenylene oxides, block copolymers of alkenyl aromatics with vinyl aromatics and polyamicesters, and blends of two or more thereof; (i) polyimides, polyetherketones, polyamideimides, and blends of two or more thereof; and (j) polycarbonate/polyester copolymers and blends.

It also is recognized that thermoplastic materials can be "converted" into thermoset materials by cross-linking the polymer chains so they form a network structure, and such cross-linked thermoplastic materials may be used to form the outer core and/or inner cover layers in accordance with this invention. For example, thermoplastic polyolefins such as linear low density polyethylene (LLDPE), low density polyethylene (LDPE), and high density polyethylene (HDPE) may be cross-linked to form bonds between the polymer chains. The cross-linked thermoplastic material typically has improved physical properties and strength over non-cross-linked thermoplastics, particularly at temperatures above the crystalline melting point. Preferably a partially or fully-neutralized ionomer, as described above, is covalently cross-linked to render it into a thermoset composition (that is, it contains at least some level of covalent, irreversible cross-links). Thermoplastic polyurethanes and polyureas also may be converted into thermoset materials in accordance with the present invention.

Modifications in the thermoplastic polymeric structure of thermoplastics can be induced by a number of methods, including exposing the thermoplastic material to high-energy radiation or through a chemical process using peroxide. Radiation sources include, but are not limited to, gamma-rays, electrons, neutrons, protons, x-rays, helium nuclei, or the like. Gamma radiation, typically using radioactive cobalt atoms and allows for considerable depth of treatment, if necessary. For core layers requiring lower depth of penetration, electron-beam accelerators or UV and IR light sources can be used. Useful UV and IR irradiation methods are disclosed in U.S. Pat. Nos. 6,855,070 and 7,198,576, which are incorporated herein by reference. The thermoplastic core layers may be irradiated at dosages greater than 0.05 Mrd, preferably ranging from 1 Mrd to 20 Mrd, more preferably from 2 Mrd to 15 Mrd, and most preferably from 4 Mrd to 10 Mrd. In one preferred embodiment, the cores are irradiated at a dosage from 5 Mrd to 8 Mrd and in another preferred embodiment, the cores are irradiated with a dosage from 0.05 Mrd to 3 Mrd, more preferably 0.05 Mrd to 1.5 Mrd.

The cross-linked thermoplastic material may be created by exposing the thermoplastic to: 1) a high-energy radiation treatment, such as electron beam or gamma radiation, such as disclosed in U.S. Pat. No. 5,891,973, which is incorporated by reference herein, 2) lower energy radiation, such as ultra-violet (UV) or infra-red (IR) radiation; 3) a solution treatment, such as an isocyanate or a silane; 4) incorporation of additional free radical initiator groups in the thermoplastic prior to molding; and/or 5) chemical modification, such as esterification or saponification, to name a few.

Core Structure

As discussed above, the core of the golf ball of this invention preferably has a dual-layered structure comprising an inner core and outer core layer. The hardness of the core sub-assembly (inner core and outer core layer) is an important property. In general, cores with relatively high hardness values have higher compression and tend to have good durability and resiliency. However, some high compression balls are stiff and this may have a detrimental effect on shot control and placement. Thus, the optimum balance of hardness in the core sub-assembly needs to be attained.

In one preferred golf ball, the inner core (center) has a "positive" hardness gradient (that is, the outer surface of the inner core is harder than its geometric center); and the outer core layer has a "positive" hardness gradient (that is, the outer surface of the outer core layer is harder than the inner surface of the outer core layer.) In such cases where both the inner core and outer core layer each has a "positive" hardness gradient, the outer surface hardness of the outer core layer is preferably greater than the hardness of the geometric center of the inner core. In one preferred version, the positive hardness gradient of the inner core is in the range of about 2 to about 40 Shore C units and even more preferably about 10 to about 25 Shore C units; while the positive hardness gradient of the outer core is in the range of about 2 to about 20 Shore C and even more preferably about 3 to about 10 Shore C.

In an alternative version, the inner core may have a positive hardness gradient; and the outer core layer may have a "zero" hardness gradient (that is, the hardness values of the outer surface of the outer core layer and the inner surface of the outer core layer are substantially the same) or a "negative" hardness gradient (that is, the outer surface of the outer core layer is softer than the inner surface of the outer core layer.) For example, in one version, the inner core has a positive hardness gradient; and the outer core layer has a negative hardness gradient in the range of about 2 to about 25 Shore C.

In general, hardness gradients are further described in Bulpett et al., U.S. Pat. Nos. 7,537,529 and 7,410,429, the disclosures of which are hereby incorporated by reference. Methods for measuring the hardness of the inner core and outer core layers along with other layers in the golf ball and determining the hardness gradients of the various layers are described in further detail below. The core layers have positive, negative, or zero hardness gradients defined by hardness measurements made at the outer surface of the inner core (or outer surface of the outer core layer) and radially inward towards the center of the inner core (or inner surface of the outer core layer). These measurements are made typically at 2-mm increments as described in the test methods below. In general, the hardness gradient is determined by subtracting the hardness value at the innermost portion of the component being measured (for example, the center of the inner core or inner surface of the outer core layer) from the hardness value at the outer surface of the component being measured (for example, the outer surface of the inner core or outer surface of the outer core layer).

Positive Hardness Gradient.

For example, if the hardness value of the outer surface of the inner core is greater than the hardness value of the inner core's geometric center (that is, the inner core has a surface harder than its geometric center), the hardness gradient will be deemed "positive" (a larger number minus a smaller number equals a positive number.) For example, if the outer surface of the inner core has a hardness of 67 Shore C and the geometric center of the inner core has a hardness of 60 Shore C, then the inner core has a positive hardness gradient of 7. Likewise, if the outer surface of the outer core layer has a greater hardness value than the inner surface of the outer core layer, the given outer core layer will be considered to have a positive hardness gradient.

Negative Hardness Gradient.

On the other hand, if the hardness value of the outer surface of the inner core is less than the hardness value of the inner core's geometric center (that is, the inner core has a surface softer than its geometric center), the hardness gradient will be deemed "negative." For example, if the outer surface of the inner core has a hardness of 68 Shore C and the geometric center of the inner core has a hardness of 70 Shore C, then the inner core has a negative hardness gradient of 2. Likewise, if the outer surface of the outer core layer has a lesser hardness value than the inner surface of the outer core layer, the given outer core layer will be considered to have a negative hardness gradient.

Zero Hardness Gradient.

In another example, if the hardness value of the outer surface of the inner core is substantially the same as the hardness value of the inner core's geometric center (that is, the surface of the inner core has about the same hardness as the geometric center), the hardness gradient will be deemed "zero." For example, if the outer surface of the inner core and the geometric center of the inner core each has a hardness of 65 Shore C, then the inner core has a zero hardness gradient. Likewise, if the outer surface of the outer core layer has a hardness value approximately the same as the inner surface of the outer core layer, the outer core layer will be considered to have a zero hardness gradient.

More particularly, the term, "positive hardness gradient" as used herein means a hardness gradient of positive 3 Shore C or greater, preferably 7 Shore C or greater, more preferably 10 Shore C, and even more preferably 20 Shore C or greater. The term, "zero hardness gradient" as used herein means a hardness gradient of less than 3 Shore C, preferably less than 1 Shore C and may have a value of zero or negative 1 to negative 10 Shore C. The term, "negative hardness gradient" as used herein means a hardness value of less than zero, for example, negative 3, negative 5, negative 7, negative 10, negative 15, or negative 20 or negative 25. The terms, "zero hardness gradient" and "negative hardness gradient" may be used herein interchangeably to refer to hardness gradients of negative 1 to negative 10.

The hardness gradients of the inner core are discussed above. On the other hand, the outer core layer preferably has an outer surface hardness ($H_{outer\ surface\ of\ OC}$) of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The outer surface hardness of the outer core layer ($H_{outer\ surface\ of\ OC}$), as measured in Shore C units, preferably has a lower limit of about 40 or 42 or 45 or 48 or 50 or 54 or 58 or 60 or 63 or 65 or 67 or 720 or 72 or 73 or 76 Shore C, and an upper limit of about 78 or 80 or 84 or 87 or 88 or 89 or 90 or 92 or 95 Shore C. And, the inner surface of the outer core layer ($H_{inner\ surface\ of\ OC}$) or midpoint hardness of the outer core layer ($H_{midpoint\ of\ OC}$), preferably has a hardness of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The inner surface hardness ($H_{inner\ surface\ of\ OC}$) or midpoint hardness ($H_{midpoint\ of\ OC}$) of the outer core layer, as measured in Shore C units, preferably has a lower limit of about 40 or 42 or 44 or 45 or 47 or 50 or 52 or 54 or 55 or 58 or 60 or 63 or 65 or 67 or 70 or 73 or 75 Shore C, and an upper limit of about 78 or 80 or 85 or 88 or 89 or 90 or 92 or 95 Shore C. The midpoint of the outer core layer is taken at a point equidistant from the inner surface and outer surface of the layer to be measured. Once one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

In one embodiment, the outer surface hardness of the outer core layer ($H_{outer\ surface\ of\ OC}$), is less than the outer surface hardness ($H_{inner\ core\ surface}$) or midpoint hardness ($H_{midpoint\ of\ OC}$), of the inner core by at least 3 Shore C units and more preferably by at least 5 Shore C.

In a second embodiment, the outer surface hardness of the outer core layer ($H_{outer\ surface\ of\ OC}$), is greater than the outer surface hardness ($H_{inner\ core\ surface}$) or midpoint hardness ($H_{midpoint\ of\ OC}$), of the inner core by at least 3 Shore C units and more preferably by at least 5 Shore C.

As discussed above, the inner core is preferably formed from a foamed thermoplastic or thermoset composition and more preferably foamed polyurethanes. And, the outer core layer is formed preferably from a non-foamed thermoset composition such as polybutadiene rubber. The outer core layer also may be formed from non-foamed thermoplastic compositions.

The core structure also has a hardness gradient across the entire core assembly. In one embodiment, the ($H_{inner\ core\ center}$) is in the range of about 10 Shore C to about 60 Shore C, preferably about 13 Shore C to about 55 Shore C; and the ($H_{outer\ surface\ of\ OC}$) is in the range of about 65 to about 96 Shore C, preferably about 68 Shore C to about 94 Shore C or about 75 Shore C to about 93 Shore C, to provide a positive hardness gradient across the core assembly. The gradient across the core assembly will vary based on several factors including, but not limited to, the dimensions of the inner core, optional intermediate core layer, and outer core layers.

As discussed above, in one preferred embodiment, the inner core has a specific gravity in the range of about 0.25 to about 1.50 g/cc. Also, as discussed above, the specific gravity of the inner core may vary at different points of the inner core structure. That is, there may be a specific gravity gradient in the inner core. For example, in one preferred version, the geometric center of the inner core has a density in the range of about 0.25 to about 0.75 g/cc; while the outer skin of the inner core has a density in the range of about 0.75 to about 1.50 g/cc.

Meanwhile, the outer core layer preferably has a relatively high specific gravity. Thus, the specific gravity of the inner core layer ($SG_{inner}$) is preferably less than the specific gravity of the outer core layer ($SG_{outer}$). By the term, "specific gravity of the outer core layer" ("$SG_{outer}$"), it is generally meant the specific gravity of the outer core layer as measured at any point of the outer core layer. The specific gravity values at different points in the outer core layer may vary. That is, there may be specific gravity gradients in the outer core layer similar to the inner core. For example, the outer core layer may have a specific gravity within a range having a lower limit of about 0.50 or 0.60 or 0.70 or 0.75 or 0.85 or 0.95 or 1.00 or 1.10 or 1.25 or 1.30 or 1.36 or 1.40 or 1.42 or 1.48 or 1.50 or 1.60 or 1.66 or 1.75 or 2.00 and an upper limit of 2.50 or 2.60 or 2.80 or 2.90 or 3.00 or 3.10 or 3.25 or 3.50 or 3.60 or 3.80 or 4.00, 4.25 or 5.00 or 5.10 or 5.20 or 5.30 or 5.40 or 6.00 or 6.20 or 6.25 or 6.30 or 6.40 or 6.50 or 7.00 or 7.10 or 7.25 or 7.50 or 7.60 or 7.65 or 7.80 or 8.00 or 8.20 or 8.50 or 9.00 or 9.75 or 10.00 g/cc.

In general, the specific gravities of the respective pieces of an object affect the Moment of Inertia (MOI) of the object. The Moment of Inertia of a ball (or other object) about a given axis generally refers to how difficult it is to change the ball's angular motion about that axis. If the ball's mass is concentrated towards the center (the center piece (for example, inner core) has a higher specific gravity than the outer piece (for example, outer core layers), less force is required to change its rotational rate, and the ball has a relatively low Moment of Inertia. In such balls, most of the mass is located close to the ball's axis of rotation and less force is needed to generate spin. Thus, the ball has a generally high spin rate as the ball leaves the club's face after making impact. Conversely, if the ball's mass is concentrated towards the outer surface (the outer piece (for example, outer core layers) has a higher specific gravity than the center piece (for example, inner core), more force is required to change its rotational rate, and the ball has a relatively high Moment of Inertia. That is, in such balls, most of the mass is located away from the ball's axis of rotation and more force is needed to generate spin. Such balls have a generally low spin rate as the ball leaves the club's face after making impact.

More particularly, as described in Sullivan, U.S. Pat. No. 6,494,795 and Ladd et al., U.S. Pat. No. 7,651,415, the formula for the Moment of Inertia for a sphere through any diameter is given in the CRC Standard Mathematical Tables, 24th Edition, 1976 at 20 (hereinafter CRC reference). The term, "specific gravity" as used herein, has its ordinary and customary meaning, that is, the ratio of the density of a substance to the density of water at 4° C., and the density of water at this temperature is 1 g/cm³.

In one embodiment, the golf balls of this invention are relatively low spin and long distance. That is, the foam core construction, as described above, wherein the inner core is made of a foamed composition helps provide a relatively low spin ball having good resiliency. The inner foam cores of this invention preferably have a Coefficient of Restitution (COR) of about 0.300 or greater; more preferably about 0.400 or greater, and even more preferably about 0.450 or greater. The resulting balls containing the dual-layered core constructions of this invention and cover of at least one layer preferably have a COR of about 0.700 or greater, more preferably about 0.730 or greater; and even more preferably about 0.750 to 0.810 or greater. The inner foam cores preferably have a Soft Center Deflection Index ("SCDI") compression, as described in the Test Methods below, in the range of about 50 to about 190, and more preferably in the range of about 60 to about 170.

The USGA has established a maximum weight of 45.93 g (1.62 ounces) for golf balls. For play outside of USGA rules, the golf balls can be heavier. In one preferred embodiment, the weight of the multi-layered core is in the range of about 28 to about 38 grams. Also, golf balls made in accordance with this invention can be of any size, although the USGA requires that golf balls used in competition have a diameter of at least 1.68 inches. For play outside of United States Golf Association (USGA) rules, the golf balls can be of a smaller size. Normally, golf balls are manufactured in accordance with USGA requirements and have a diameter in the range of about 1.68 to about 1.80 inches. As discussed further below, the golf ball contains a cover which may be multi-layered and in addition may contain intermediate (casing) layers, and the thickness levels of these layers also must be considered. Thus, in general, the dual-layer core structure normally has an overall diameter within a range having a lower limit of about 1.00 or 1.20 or 1.30 or 1.40 inches and an upper limit of about 1.58 or 1.60 or 1.62 or 1.66 inches, and more preferably in the range of about 1.3 to 1.65 inches. In one embodiment, the diameter of the core sub-assembly is in the range of about 1.45 to about 1.62 inches.

Cover Structure

The golf ball sub-assemblies of this invention may be enclosed with one or more cover layers. The golf ball sub-assembly may comprise the multi-layered core structure as discussed above. In other versions, the golf ball sub-assembly includes the core structure and one or more casing (mantle) layers disposed about the core. In one particularly preferred version, the golf ball includes a multi-layered cover comprising inner and outer cover layers. The inner cover layer is preferably formed from a composition comprising an ionomer or a blend of two or more ionomers that helps impart hardness to the ball. In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont). Fusabond 525D® is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is an 84 wt %/16 wt % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

The inner cover layer also may be formed from a composition comprising a 50/45/5 blend of Surlyn® 8940/Surlyn® 9650/Nucrel® 960, and, in a particularly preferred embodiment, the composition has a material hardness of from 80 to 85 Shore C. In yet another version, the inner cover layer is formed from a composition comprising a 50/25/25 blend of Surlyn® 8940/Surlyn® 9650/Surlyn® 9910, preferably having a material hardness of about 90 Shore C. The inner cover layer also may be formed from a composition comprising a 50/50 blend of Surlyn® 8940/Surlyn® 9650, preferably having a material hardness of about 86 Shore C. A composition comprising a 50/50 blend of Surlyn® 8940 and Surlyn® 7940 also may be used. Surlyn® 8940 is an E/MAA copolymer in which the MAA acid groups have been partially neutralized with sodium ions. Surlyn® 9650 and Surlyn® 9910 are two different grades of E/MAA copolymer in which the MAA acid groups have been partially neutralized with zinc ions. Nucrel® 960 is an E/MAA copolymer resin nominally made with 15 wt % methacrylic acid.

A wide variety of materials may be used for forming the outer cover including, for example, polyurethanes; polyureas; copolymers, blends and hybrids of polyurethane and polyurea; olefin-based copolymer ionomer resins (for example, Surlyn® ionomer resins and DuPont HPF® 1000 and HPF® 2000, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

The compositions used to make the casing (mantle) and cover layers may contain a wide variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, optical brighteners, coloring agents, fluorescent agents, whitening agents, UV absorbers, light stabilizers, surfactants, processing aids, antioxidants, stabilizers, softening agents, fragrance components, plasticizers, impact modifiers, titanium dioxide, clay, mica, talc, glass flakes, milled glass, and mixtures thereof.

The inner cover layer preferably has a material hardness within a range having a lower limit of 70 or 75 or 80 or 82 Shore C and an upper limit of 85 or 86 or 90 or 92 Shore C. The thickness of the intermediate layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail below.

A single cover or, preferably, an inner cover layer is formed around the outer core layer. When an inner cover layer is present, an outer cover layer is formed over the inner cover layer. Most preferably, the inner cover is formed from an ionomeric material and the outer cover layer is formed from a polyurethane material, and the outer cover layer has a hardness that is less than that of the inner cover layer. Preferably, the inner cover has a hardness of greater than about 60 Shore D and the outer cover layer has a hardness of less than about 60 Shore D. In an alternative embodiment, the inner cover layer is comprised of a partially or fully neutralized ionomer, a thermoplastic polyester elastomer such as Hytrel™, commercially available form DuPont, a thermoplastic polyether block amide, such as Pebax™, commercially available from Arkema, Inc., or a thermoplastic or thermosetting polyurethane or polyurea, and the outer cover layer is comprised of an ionomeric material. In this alternative embodiment, the inner cover layer has a hardness of less than about 60 Shore D and the outer cover layer has a hardness of greater than about 55 Shore D and the inner cover layer hardness is less than the outer cover layer hardness.

As discussed above, the core structure of this invention may be enclosed with one or more cover layers. In one embodiment, a multi-layered cover comprising inner and outer cover layers is formed, where the inner cover layer has a thickness of about 0.01 inches to about 0.06 inches, more preferably about 0.015 inches to about 0.040 inches, and most preferably about 0.02 inches to about 0.035 inches. In this version, the inner cover layer is formed from a partially- or fully-neutralized ionomer having a Shore D hardness of greater than about 55, more preferably greater than about 60, and most preferably greater than about 65. The outer cover layer, in this embodiment, preferably has a thickness of about 0.015 inches to about 0.055 inches, more preferably about 0.02 inches to about 0.04 inches, and most preferably about 0.025 inches to about 0.035 inches, with a hardness of about Shore D 80 or less, more preferably 70 or less, and most preferably about 60 or less. The inner cover layer is harder than the outer cover layer in this version. A preferred outer cover layer is a castable or reaction injection molded polyurethane, polyurea or copolymer, blend, or hybrid thereof having a Shore D hardness of about 40 to about 50. In another multi-layer cover, dual-core embodiment, the outer cover and inner cover layer materials and thickness are the same but, the hardness range is reversed, that is, the outer cover layer is harder than the inner cover layer. For this harder outer cover/softer inner cover embodiment, the ionomer resins described above would preferably be used as outer cover material.

Manufacturing of Golf Balls

As described above, the inner core preferably is formed by molding a foamed composition. The outer core layer, which surrounds the inner core, is formed by molding a composition over the inner core. Then, the casing and/or cover layers are applied over the core sub-assembly. Prior to this step, the core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

The cover layers are formed over the core or ball sub-assembly (the core structure and any casing layers disposed about the core) using a suitable technique such as, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. Preferably, each cover layer is separately formed over the ball subassembly. For example, an ethylene acid copolymer ionomer composition may be injection-molded to produce half-shells. Alternatively, the ionomer composition can be placed into a compression mold and molded under sufficient pressure, temperature, and time to produce the hemispherical shells. The smooth-surfaced hemispherical shells are then placed around the core sub-assembly in a compression mold. Under sufficient heating and pressure, the shells fuse together to form an inner cover layer that surrounds the sub-assembly. In another method, the ionomer composition is injection-molded directly onto the core sub-assembly using retractable pin injection molding. An outer cover layer comprising a polyurethane or polyurea composition over the ball sub-assembly may be formed by using a casting process.

After the golf balls have been removed from the mold, they may be subjected to finishing steps such as flash-trimming, surface-treatment, marking, coating, and the like using techniques known in the art. For example, in traditional white-colored golf balls, the white-pigmented cover may be surface-treated using a suitable method such as, for example, corona, plasma, or ultraviolet (UV) light-treatment. Then, indicia such as trademarks, symbols, logos, letters, and the like may be printed on the ball's cover using pad-printing, ink-jet printing, dye-sublimation, or other suitable printing methods. Clear surface coatings (for example, primer and top-coats), which may contain a fluorescent whitening agent, are applied to the cover. The resulting golf ball has a glossy and durable surface finish.

Figure 6:
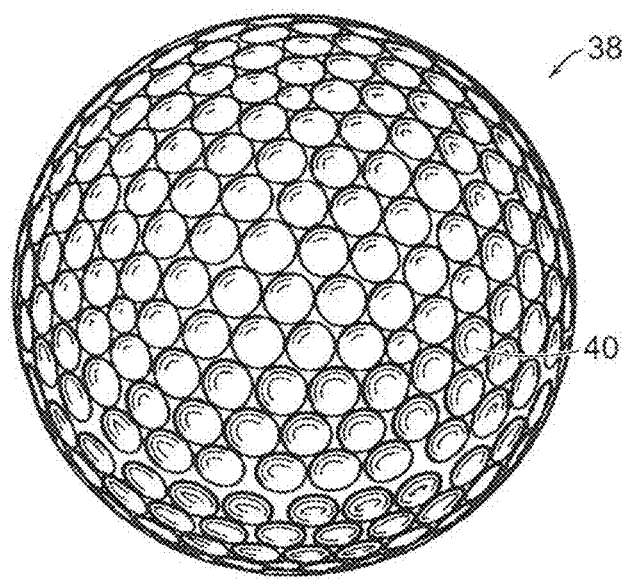
FIG. 6 is a perspective view of a finished golf ball having a dimpled cover made in accordance with the present invention.

In another finishing process, the golf balls are painted with one or more paint coatings. For example, white primer paint may be applied first to the surface of the ball and then a white top-coat of paint may be applied over the primer. Of course, the golf ball may be painted with other colors, for example, red, blue, orange, and yellow. As noted above, markings such as trademarks and logos may be applied to the painted cover of the golf ball. Finally, a clear surface coating may be applied to the cover to provide a shiny appearance and protect any logos and other markings printed on the ball. In FIG. 6, a finished golf ball (38) having a dimpled outer cover (40) made in accordance with the present invention is shown. As discussed above, various patterns and geometric shapes of the dimples (40) can be used to modify the aerodynamic properties of the golf ball.

Different ball constructions can be made using the methods and core constructions of this invention as shown in FIGS. 1-6. Such golf ball constructions include, for example, five-piece, and six-piece constructions. It should be understood that the golf ball components and finished golf balls shown in FIGS. 1-6 are for illustrative purposes only, and they are not meant to be restrictive. Other golf ball constructions can be made in accordance with this invention. For example, the foam composition of this invention is primarily discussed herein as being suitable for producing a foam inner core or center for a golf ball. However, it is recognized that this foam composition may be used for producing an outer core layer, casing layer, cover, or any other suitable component layer for the golf ball in accordance with this invention.

Cores Having Three Layers

In another example, multi-layered cores having an inner core, intermediate core layer, and outer core layer, wherein the intermediate core layer is disposed between the intermediate and outer core layers may be prepared in accordance with this invention. More particularly, as discussed above, the inner core may be constructed from a foamed composition, preferably foamed polyurethane. Meanwhile, the intermediate and outer core layers may be formed from non-foamed thermoset or thermoplastic materials. Suitable thermoset and thermoplastic compositions that may be used to form the intermediate/outer core layers are discussed above. For example, each of the intermediate and outer core layers may be formed from a thermoset rubber composition. Thus, the intermediate core layer may be formed from a first thermoset rubber composition; and the outer core layer may be formed from a second thermoset rubber composition. In another embodiment, the intermediate core layer is formed from a non-foamed thermoset composition; and the outer core layer is formed from a non-foamed thermoplastic composition. In a third embodiment, the intermediate core layer is formed from a non-foamed thermoplastic composition; and the outer core layer is formed from a non-foamed thermoset composition. Finally, in a fourth embodiment, the intermediate core layer is formed from a first non-foamed thermoplastic composition; and the outer core layer is formed from a second non-foamed thermoplastic compositions.

The above-discussed thermoset and thermoplastic compositions may be used to form the intermediate and outer core layers. In one embodiment, the specific gravity of the inner core (foamed composition) is less than the specific gravity of the intermediate and outer core layers. The specific gravities of the intermediate and outer core layers may be the same or different. In one version, the specific gravity of the intermediate core layer is greater than the specific gravity of the outer core layer. In another version, the specific gravity of the outer core is greater than the specific gravity of the intermediate core layer.

Test Methods

Hardness.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used. Likewise, the midpoint of a core layer is taken at a point equidistant from the inner surface and outer surface of the layer to be measured, most typically an outer core layer. Once again, when one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

Compression.

As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, compression refers to Soft Center Deflection Index ("SCDI"). The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. The SCDI is a slight variation of this set up. The hardware is the same, but the software and output has changed. With the SCDI, the interest is in the pounds of force required to deflect a core x amount of inches. That amount of deflection is 10% percent of the core diameter. The DCM is triggered, the cylinder deflects the core by 10% of its diameter, and the DCM reports back the pounds of force required (as measured from the attached load cell) to deflect the core by that amount. The value displayed is a single number in units of pounds.

Coefficient of Restitution ("COR").

The COR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period (COR=$V_{out}/V_{in}$=$T_{in}/T_{out}$).

Density.

The density refers to the weight per unit volume (typically, g/cm$^3$) of the material and can be measured per ASTM D-1622.

EXAMPLES

The following prophetic examples describe core assemblies that can be made in accordance with this invention. The foam center of the core can be made from a polyurethane or ethylene vinyl acetate foam or any other suitable foam formulation. The outer core layer can be made from any suitable thermoset or thermoplastic composition. For example, polybutadiene rubbers can be used. The properties of the core assemblies are described in below Table 2.

TABLE 2

| | Examples | | | | |
|---|---|---|---|---|---|
| | A | B | C | D | E |
| Inner Core | | | | | |
| Material type | foamed polyurethane | foamed ethylene vinyl acetate | foamed polyurethane | foamed polyurethane | foamed ethylene vinyl acetate |
| Diameter | 0.3" | 0.75" | 1" | 0.75" | 1" |
| Volume (cm$^3$) | 0.23 | 3.62 | 8.6 | 3.62 | 8.6 |
| Density | 0.5 | 0.5 | 0.7 | 0.6 | 0.7 |
| $H_{inner\ core\ center}$ | 12C | 24C | 23C | 20C | 40C |
| $H_{midpoint\ IC\ outer\ region}$ | 15C | 30C | 26C | 24C | 48C |
| $H_{inner\ core\ surface}$ | 16C | 33C | 29C | 25C | 51C |
| Inner Core gradient | +4 | +9 | +6 | +5 | +11 |
| Outer Core Layer | | | | | |
| Material type | thermoset rubber | thermoplastic polymer | thermoplastic polymer | thermoset rubber | thermoset rubber |
| Thickness | 0.635" | 0.40" | 0.275" | 0.40" | 0.285" |
| Core volume (cm$^3$) | 33.2 | 31.9 | 31.9 | 31.9 | 33.2 |
| Outer core volume (cm$^3$) | 33 | 28.3 | 23.3 | 28.3 | 24.6 |
| Core Assembly | | | | | |
| Diameter | 1.57" | 1.55" | 1.55" | 1.55" | 1.57" |
| Density | 1.16 | 1.24 | 1.33 | 1.18 | 1.31 |
| $H_{outer\ surface\ OC}$ | 81C | 78C | 85C | 85C | 89C |
| Core Gradient | +69 | +54 | +62 | +65 | +49 |

It is understood that the golf ball compositions, constructions, and products described and illustrated herein represent only some embodiments of the invention. It is appreciated by those skilled in the art that various changes and additions can be made to compositions, constructions, and products without departing from the spirit and scope of this invention. It is intended that all such embodiments be covered by the appended claims.

We claim:

1. A golf ball, comprising a core assembly and a cover, the core assembly comprising:

i) an inner core comprising a foam composition having a geometric center, an outer region, and outer surface, wherein the foam composition is foamed in the center and at least partially-collapsed in the outer region, the inner core having an outer surface thickness in the range of about 0.001 to about 0.250 inches and an outer region thickness in the range of about 0.020 inches to about 0.440 inches; and a diameter in the range of about 0.100 to about 1.100 inches and an outer surface hardness ($H_{inner\ core\ surface}$) and a center hardness ($H_{inner\ core\ center}$), the $H_{inner\ core\ surface}$ being greater than the $H_{inner\ core\ center}$ to provide a positive hardness gradient in the inner core; and ii) an outer core layer comprising a non-foamed thermoset or thermoplastic composition, the outer core layer being disposed about the inner core layer and having a thickness in the range of about 0.100 to about 0.750 inches, and an outer surface hardness ($H_{outer\ surface\ of\ OC}$), wherein the ($H_{outer\ surface\ of\ OC}$) is greater than the ($H_{inner\ core\ center}$) to provide a positive hardness gradient across the core assembly.

2. The golf ball of claim 1, wherein the inner core comprises a foamed polyurethane composition.

3. The golf ball of claim 1, wherein the inner core comprises a foamed ethylene vinyl acetate composition.

4. The golf ball of claim 1, wherein the outer core layer comprises at least one thermoset rubber material selected from the group consisting of polybutadiene, ethylene-propylene rubber, ethylene-propylene-diene rubber, polyisoprene, styrene-butadiene rubber, polyalkenamers, butyl rubber, halobutyl rubber, polystyrene elastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and mixtures thereof.

5. The golf ball of claim 4, wherein the outer core layer comprises a thermoset polybutadiene rubber composition.

6. The golf ball of claim 1, wherein the outer core layer comprises a thermoplastic polymer selected from the group consisting of partially-neutralized ionomers; highly-neutralized ionomers; polyesters; polyamides; polyamide-ethers, polyamide-esters; polyurethanes, polyureas; fluoropolymers; polystyrenes; polypropylenes; polyethylenes; polyvinyl chlorides; polyvinyl acetates; polycarbonates; polyvinyl alcohols; polyester-ethers; polyethers; polyimides, polyetherketones, polyamideimides; and mixtures thereof.

7. The golf ball of claim 6, wherein the thermoplastic material is an ionomer composition comprising an O/X-type copolymer, wherein O is selected from the group consisting of ethylene and propylene, and X is selected from the group consisting of methacrylic acid, acrylic acid, ethacrylic acid, crotonic acid, maleic acid, fumaric acid, and itaconic acid.

8. The golf ball of claim 7, wherein the O of the O/X-type acid copolymer is ethylene and the X is methacrylic acid or acrylic acid.

9. The golf ball of claim 1, wherein the $H_{inner\ core\ center}$ is in the range of about 10 to about 55 Shore C and the $H_{inner\ core\ surface}$ is in the range of about 15 to about 60 Shore C to provide a positive hardness gradient.

10. The golf ball of claim 1, wherein the inner core further has a midpoint hardness in the outer region ($H_{midpoint\ inner\ core\ outer\ region}$) and the $H_{inner\ core\ surface}$ is greater than the $H_{midpoint\ inner\ core\ outer\ region}$ and the $H_{midpoint\ inner\ core\ outer\ region}$ is greater than the $H_{inner\ core\ center}$.

11. The golf ball of claim 10, wherein the $H_{midpoint\ of\ OC}$ is in the range of about 45 to about 90 Shore C and the $H_{outer\ surface\ of\ OC}$ is in the range of about 50 to about 98 Shore C.

12. The golf ball of claim 1, wherein the outer core layer has an outer surface hardness ($H_{outer\ surface\ of\ OC}$) and a midpoint hardness ($H_{midpoint\ of\ OC}$), the $H_{outer\ surface\ of\ OC}$ being greater than the ($H_{midpoint\ of\ OC}$), to provide a positive hardness gradient.

13. The golf ball of claim 1, wherein the inner core has an outer surface specific gravity ($SG_{inner\ core\ surface}$) and a center specific gravity ($SG_{inner\ core\ center}$), the $SG_{inner\ core\ surface}$ being greater than the $SG_{inner\ core\ center}$.

14. The golf ball of claim 13, wherein the inner core further has a midpoint specific gravity in the outer region ($SG_{midpoint\ inner\ core\ outer\ region}$) and the $SG_{inner\ core\ surface}$ is greater than the $SG_{midpoint\ inner\ core\ outer\ region}$ and the $SG_{midpoint\ inner\ core\ outer\ region}$ is greater than the $SG_{inner\ core\ center}$.

15. The golf ball of claim 1, wherein the center hardness of the inner core ($H_{inner\ core\ center}$) is in the range of about 12 Shore C to about 62 Shore C and the outer surface hardness of the outer core layer ($H_{outer\ surface\ of\ OC}$) is in the range of about 42 Shore C to about 92 Shore C to provide a positive hardness gradient across the core assembly.

16. The golf ball of claim 15, wherein the positive hardness gradient across the core assembly is at least 40 units.

17. The golf ball of claim 1, wherein the cover is a single layer.

18. The golf ball of claim 1, wherein the cover comprises an inner cover layer and outer cover layer, each cover having a surface hardness, wherein the surface hardness of the inner cover layer is greater than the surface hardness of the outer cover layer.

* * * * *